(12) United States Patent
Niwa

(10) Patent No.: US 11,936,996 B2
(45) Date of Patent: Mar. 19, 2024

(54) SOLID-STATE IMAGING ELEMENT, IMAGING DEVICE, AND METHOD FOR CONTROLLING SOLID-STATE IMAGING ELEMENT

(71) Applicant: Sony Semiconductor Solutions Corporation, Kanagawa (JP)

(72) Inventor: Atsumi Niwa, Kanagawa (JP)

(73) Assignee: Sony Semiconductor Solutions Corporation, Kanagawa (JP)

( * ) Notice: Subject to any disclaimer, the term of this patent is extended or adjusted under 35 U.S.C. 154(b) by 0 days.

(21) Appl. No.: 17/626,960

(22) PCT Filed: Jul. 8, 2020

(86) PCT No.: PCT/JP2020/026747
§ 371 (c)(1),
(2) Date: Jan. 13, 2022

(87) PCT Pub. No.: WO2021/039142
PCT Pub. Date: Mar. 4, 2021

(65) Prior Publication Data
US 2022/0264036 A1 Aug. 18, 2022

(30) Foreign Application Priority Data
Aug. 30, 2019 (JP) .................. 2019-158769

(51) Int. Cl.
*H04N 25/50* (2023.01)
*H04N 25/57* (2023.01)
(Continued)

(52) U.S. Cl.
CPC .......... *H04N 25/50* (2023.01); *H04N 25/702* (2023.01); *H04N 25/77* (2023.01); *H04N 25/79* (2023.01)

(58) Field of Classification Search
CPC ...... H04N 25/702; H04N 25/77; H04N 25/79; H04N 25/778; H04N 25/75; H04N 25/76;
(Continued)

(56) References Cited

U.S. PATENT DOCUMENTS 11,523,079 B2 * 12/2022 Niwa ............... H04N 25/59
11,659,304 B2 * 5/2023 Niwa ............... H04N 25/707
(Continued)

FOREIGN PATENT DOCUMENTS

JP 2009508085 A 2/2009
JP 5244587 B2 4/2013
(Continued)

OTHER PUBLICATIONS

International Search Report (PCT/ISA/210), International Application No. PCT/JP2020/026747, dated Sep. 8, 2020.

*Primary Examiner* — Marly S Camargo
(74) *Attorney, Agent, or Firm* — Michael Best & Friedrich LLP

(57) ABSTRACT

Miniaturization of pixels is facilitated in a solid-state imaging element that detects presence or absence of an address event. The solid-state imaging element includes a plurality of detection pixels and a detection circuit. In the solid-state imaging element including the plurality of detection pixels and the detection circuit, each of the plurality of detection pixels generates a voltage signal according to a logarithmic value of a photocurrent. Furthermore, in the solid-state imaging element including the plurality of detection pixels and the detection circuit, the detection circuit detects whether or not a change amount of a voltage signal of a detection pixel indicated by an input selection signal among the plurality of detection pixels exceeds a predetermined threshold value.

11 Claims, 25 Drawing Sheets

(51) Int. Cl.
  *H04N 25/702* (2023.01)
  *H04N 25/74* (2023.01)
  *H04N 25/75* (2023.01)
  *H04N 25/76* (2023.01)
  *H04N 25/77* (2023.01)
  *H04N 25/79* (2023.01)

(58) Field of Classification Search
  CPC .. H04N 25/703; H04N 25/707; H04N 25/573; H04N 25/745
  See application file for complete search history.

(56) References Cited

U.S. PATENT DOCUMENTS

| | | | |
|---|---|---|---|
| 2016/0227135 A1* | 8/2016 | Matolin | H04N 25/77 |
| 2020/0358977 A1* | 11/2020 | Niwa | H04N 25/772 |
| 2021/0360184 A1* | 11/2021 | Jakobson | H04N 25/75 |
| 2021/0385404 A1* | 12/2021 | Niwa | H04N 25/77 |
| 2022/0141403 A1* | 5/2022 | Mandelli | H04N 25/778 |
| 2022/0166925 A1* | 5/2022 | Nakagawa | H04N 25/50 |
| 2022/0210349 A1* | 6/2022 | Bong | H04N 25/40 |
| 2022/0375256 A1* | 11/2022 | Endo | G01B 11/2513 |
| 2023/0217127 A1* | 7/2023 | Kodama | H04N 25/74 |

FOREIGN PATENT DOCUMENTS

| | | |
|---|---|---|
| JP | 2017-050853 A | 3/2017 |
| WO | 2019/146527 A1 | 8/2019 |
| WO | 2019/150786 A1 | 8/2019 |

* cited by examiner

SOLID-STATE IMAGING ELEMENT, IMAGING DEVICE, AND METHOD FOR CONTROLLING SOLID-STATE IMAGING ELEMENT

TECHNICAL FIELD

The present technology relates to a solid-state imaging element, an imaging device, and a method for controlling a solid-state imaging element. In particular, the present technology relates to a solid-state imaging element, an imaging device, and a method for controlling a solid-state imaging element that compares a change amount in luminance with a threshold value.

BACKGROUND ART

Conventionally, a synchronous solid-state imaging element that captures image data (frame) in synchronization with a synchronizing signal such as a vertical synchronizing signal has been used in an imaging device or the like. According to this general synchronous solid-state imaging element, image data can be obtained only in each cycle (e.g., 1/60 seconds) of a synchronizing signal, whereby it is difficult to cope with a case where faster processing is required in fields related to traffic, robots, and the like. Therefore, there has been proposed an asynchronous solid-state imaging element that detects, for each pixel address, the fact that a change amount in luminance of the pixel has exceeded a threshold value as an address event (e.g., see Patent Document 1). As described above, the solid-state imaging element that detects an address event for each pixel is called a dynamic vision sensor (DVS).

CITATION LIST

Patent Document

Patent Document 1: Japanese Patent No. 5244587

SUMMARY OF THE INVENTION

Problems to be Solved by the Invention

In the asynchronous solid-state imaging element described above, presence or absence of an address event is detected to increase the speed of processing such as image recognition. However, a large number of circuits such as a logarithmic response unit, a buffer, a differentiator, and a comparator need to be disposed for each pixel to detect presence or absence of an address event, whereby the circuit scale for each pixel increases as compared with a synchronous solid-state imaging element. For this reason, there is a problem that miniaturization of pixels becomes difficult.

The present technology has been conceived in view of such a situation, and aims to facilitate miniaturization of pixels in a solid-state imaging element that detects presence or absence of an address event.

Solutions to Problems

The present technology has been conceived to solve the problem described above, and a first aspect thereof is a solid-state imaging element including a plurality of detection pixels each of which generates a voltage signal corresponding to a logarithmic value of a photocurrent and a detection circuit that detects whether or not a change amount of the voltage signal of a detection pixel indicated by an input selection signal among the plurality of detection pixels exceeds a predetermined threshold value, and a control method thereof. This exerts an effect of reducing the circuit scale of the solid-state imaging element.

Furthermore, in the first aspect, the detection circuit may include a selection unit that selects any of the voltage signal of each of the plurality of detection pixels, a differentiator that obtains and outputs a change amount of the selected voltage signal, and a comparison unit that compares the output change amount with the threshold value. This exerts an effect of reducing the circuit scale of the differentiator and subsequent elements.

Furthermore, in the first aspect, the differentiator may retain and output the selected change amount to the comparison unit. This exerts an effect of detecting an address event of the selected detection pixel.

Furthermore, in the first aspect, the differentiator may retain the change amount of each of the plurality of detection pixels, and may output the change amount corresponding to the selected detection pixel to the comparison unit. This exerts an effect of suppressing detection omission of an address event.

Furthermore, in the first aspect, each of the plurality of detection pixels may include a logarithmic response unit that generates the voltage signal and a differentiator that obtains a change amount of the generated voltage signal and outputs the change amount to the detection circuit. This exerts an effect of reducing the circuit scale of the comparison unit and subsequent elements.

Furthermore, in the first aspect, the detection circuit may include a comparison unit that selects any of the change amount of each of the plurality of detection pixels and compares the selected change amount with the threshold value. This exerts an effect of detecting an address event of the selected detection pixel.

Furthermore, in the first aspect, the detection circuit may include a selection unit that selects any of the change amount of each of the plurality of detection pixels and a comparison unit that compares the selected change amount with the threshold value. This exerts an effect of detecting an address event of the selected detection pixel.

Furthermore, in the first aspect, the threshold value may include an upper limit threshold value and a lower limit threshold value that are different from each other, and the detection circuit may include an upper-limit-side comparator that compares the upper limit threshold value with the change amount and a lower-limit-side comparator that compares the lower limit threshold value with the change amount. This exerts an effect of detecting an on-event and an off-event.

Furthermore, in the first aspect, the threshold value may include an upper limit threshold value and a lower limit threshold value that are different from each other, and the detection circuit may include a selection switch that selects either the upper limit threshold value or the lower limit threshold value and a comparator that compares the selected threshold value with the change amount. This exerts an effect of reducing the circuit scale of the comparison unit.

Furthermore, in the first aspect, a plurality of gradation pixels each of which generates a pixel signal corresponding to an exposure amount may be further included. This exerts an effect that an image with a larger information amount can be obtained.

Furthermore, in the first aspect, the threshold value may include an upper limit threshold value and a lower limit threshold value that are different from each other, and the detection circuit may include an upper-limit-side selector that selects the change amount of one of two detection pixels, a lower-limit-side selector that selects the change amount of the other of the two detection pixels, an upper-limit-side comparator that compares the one selected change amount with the upper limit threshold value, and a lower-limit-side comparator that compares the other selected change amount with the upper limit threshold value. This exerts an effect of simultaneously detecting an on-event and an off-event.

Furthermore, in the first aspect, the detection circuit may include a plurality of comparators that compares the change amount of the detection pixels different from each other with a threshold value, a selection unit that selects a comparison result of any of the comparators, and a buffer that outputs the selected comparison result. This exerts an effect that the buffer is shared by the plurality of detection pixels.

Furthermore, in the first aspect, a part of the plurality of detection pixels and the detection circuit may be disposed on a predetermined light receiving chip, and the rest of the plurality of detection pixels and the detection circuit may be disposed on a predetermined detection chip. This exerts an effect of reducing the circuit scale of the detection chip.

Furthermore, a second aspect of the present technology is an imaging device including a plurality of detection pixels each of which generates a voltage signal corresponding to a logarithmic value of a photocurrent, a detection circuit that detects whether or not a change amount of the voltage signal of a detection pixel indicated by an input selection signal among the plurality of detection pixels exceeds a predetermined threshold value, and a signal processing unit that processes a detection signal indicating a detection result of the detection circuit. This exerts an effect of reducing the circuit scale of the imaging device.

BRIEF DESCRIPTION OF DRAWINGS

There is.

MODE FOR CARRYING OUT THE INVENTION

Hereinafter, modes for carrying out the present technology (hereinafter referred to as embodiments) will be described. Descriptions will be given in the following order.

1. First Embodiment (example in which multiple detection pixels share a detection circuit)

2. Second Embodiment (example in which multiple detection pixels share a detection circuit including a differentiator)

3. Third Embodiment (example in which multiple detection pixels share a detection circuit and a differentiator retains multiple change amounts)

4. Fourth Embodiment (example in which multiple detection pixels share a detection circuit and a threshold value is switched)

5. Fifth Embodiment (example in which multiple detection pixels share a detection circuit and a comparator performs switching)

6. Sixth Embodiment (example in which multiple detection pixels share a detection circuit and gradation pixels are disposed)

7. Seventh Embodiment (example in which multiple detection pixels share a detection circuit and two-stage elements are provided in the detection circuit)

8. Applications to Mobile Body

1. First Embodiment

[Exemplary Configuration of Imaging Device]

Figure 1:
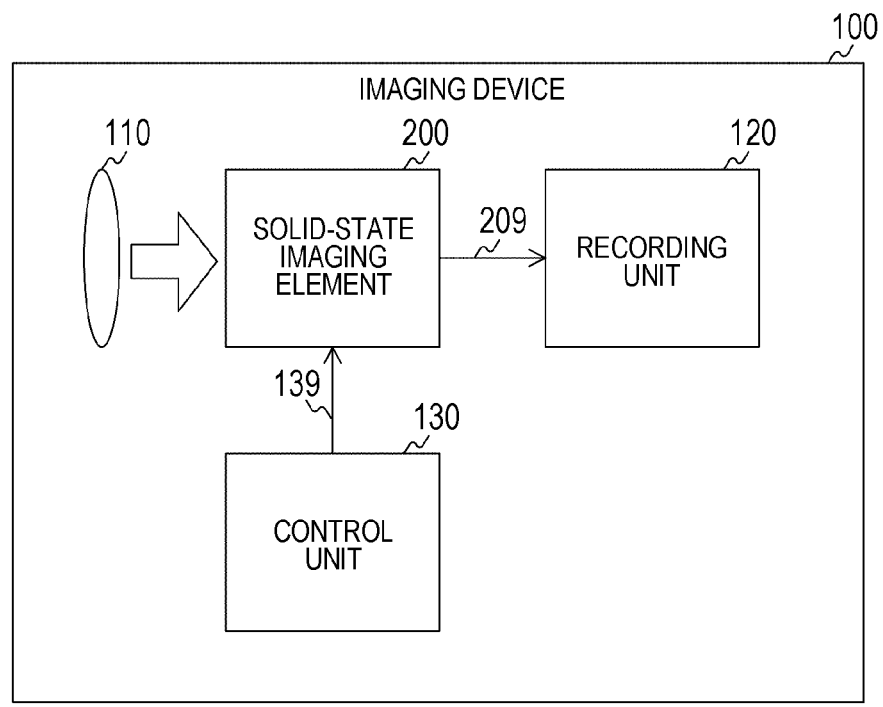
FIG. 1 is a block diagram illustrating an exemplary configuration of an imaging device according to a first embodiment of the present technology.

FIG. 1 is a block diagram illustrating an exemplary configuration of an imaging device 100 according to a first embodiment of the present technology. The imaging device 100 includes an optical unit 110, a solid-state imaging element 200, a recording unit 120, and a control unit 130. A camera to be mounted on an industrial robot, an in-vehicle camera, or the like is assumed as the imaging device 100.

The optical unit 110 condenses incident light and guides it to the solid-state imaging element 200. The solid-state imaging element 200 photoelectrically converts the incident light to capture image data. For the captured image data, the solid-state imaging element 200 performs predetermined signal processing such as image recognition processing on the image data, and outputs the processed data to the recording unit 120 via a signal line 209.

The recording unit 120 records data from the solid-state imaging element 200. The control unit 130 controls the solid-state imaging element 200 to capture image data.

[Exemplary Configuration of Solid-State Imaging Element]

Figure 2:
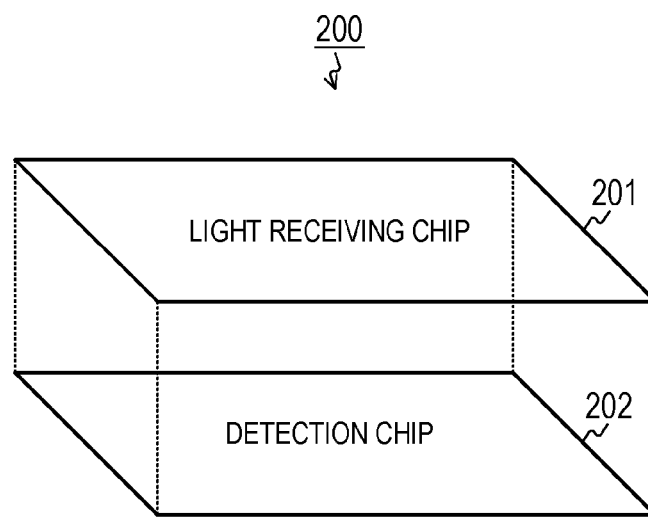
FIG. 2 is a diagram illustrating an exemplary laminated structure of a solid-state imaging element according to the first embodiment of the present technology.

FIG. 2 is a diagram illustrating an exemplary laminated structure of the solid-state imaging element 200 according to the first embodiment of the present technology. The solid-state imaging element 200 includes a detection chip 202, and a light receiving chip 201 stacked on the detection chip 202. Those chips are electrically connected through a connection portion such as a via. Note that connection can also be made by Cu—Cu bonding or a bump.

Figure 3:
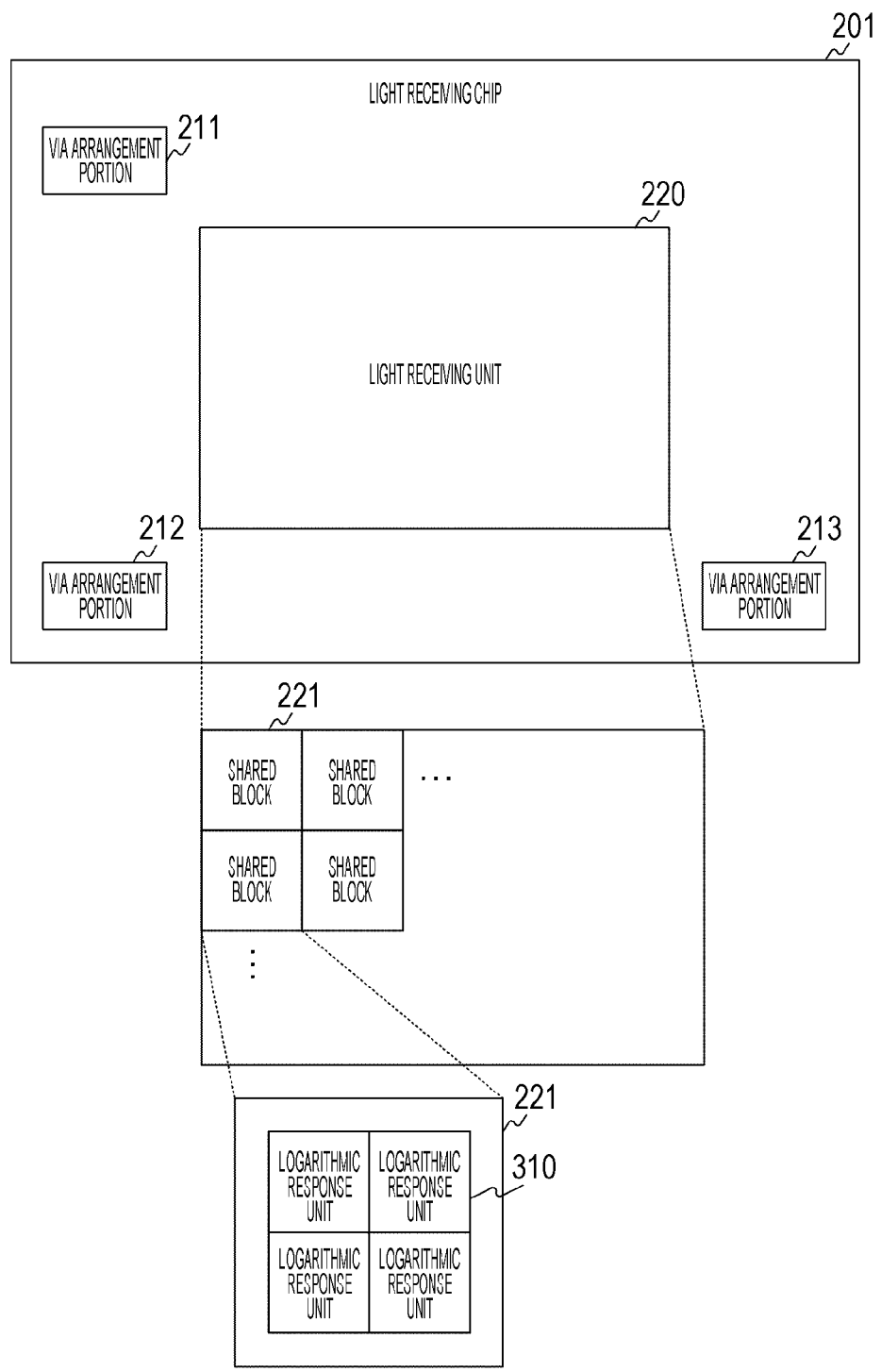
FIG. 3 is an exemplary plan view of a light receiving chip according to the first embodiment of the present technology.

FIG. 3 is an exemplary plan view of the light receiving chip 201 according to the first embodiment of the present technology. The light receiving chip 201 is provided with a light receiving unit 220, and via arrangement portions 211, 212, and 213.

Vias to be connected to the detection chip 202 are arranged in the via arrangement portions 211, 212, and 213. Furthermore, a plurality of shared blocks 221 is arranged in a two-dimensional lattice pattern in the light receiving unit 220.

A plurality of logarithmic response units 310 is arranged in each of the shared blocks 221. For example, four logarithmic response units 310 are arranged in 2 rows×2 columns for each of the shared blocks 221. Those four logarithmic response units 310 share a circuit on the detection chip 202. Details of the shared circuit will be described later. Note that the number of the logarithmic response units 310 in the shared block 221 is not limited to four.

The logarithmic response unit 310 generates voltage signals corresponding to a logarithmic value of a photocurrent. A pixel address including a row address and a column address is assigned to each of the logarithmic response units 310.

Figure 4:
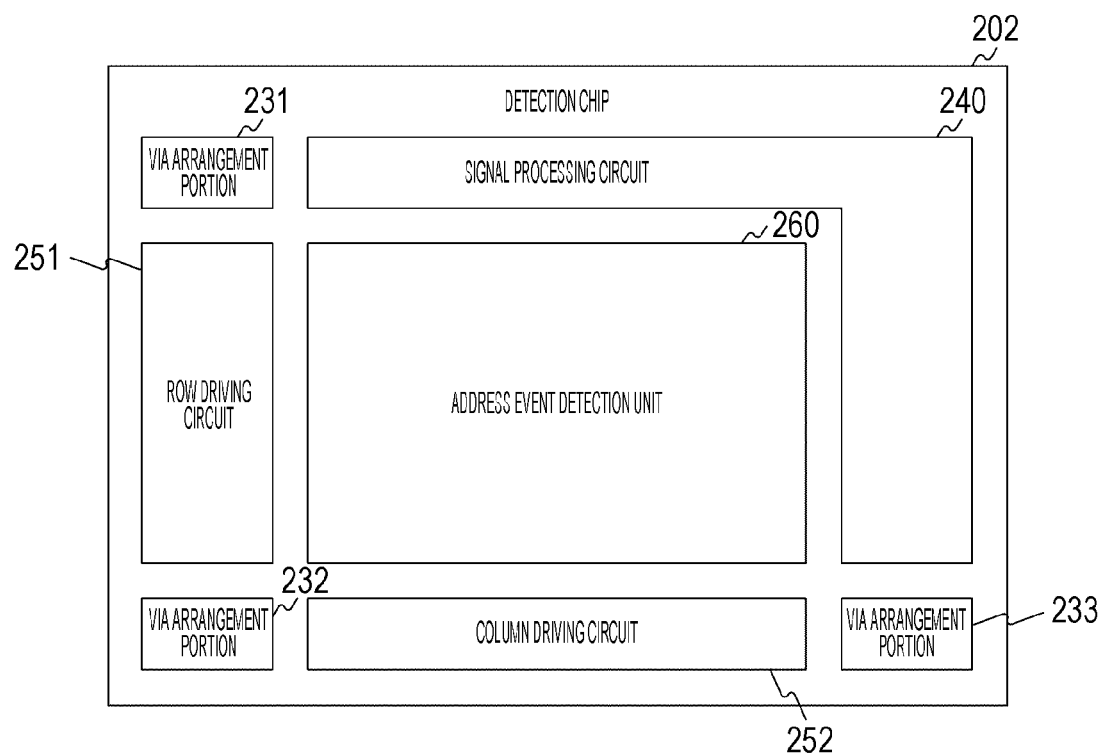
FIG. 4 is an exemplary plan view of a detection chip according to the first embodiment of the present technology.

FIG. 4 is an exemplary plan view of the detection chip 202 according to the first embodiment of the present technology.

The detection chip 202 includes via arrangement portions 231, 232, and 233, a signal processing circuit 240, a row driving circuit 251, a column driving circuit 252, and an address event detection unit 260. Vias to be connected to the light receiving chip 201 are arranged in the via arrangement portions 231, 232, and 233.

The address event detection unit 260 detects presence or absence of an address event for each of the logarithmic response units 310, and generates a detection signal indicating a detection result.

The row driving circuit 251 selects a row address, and causes the address event detection unit 260 to output a detection signal corresponding to the row address.

The column driving circuit 252 selects a column address, and causes the address event detection unit 260 to output a detection signal corresponding to the column address.

The signal processing circuit 240 performs predetermined signal processing on the detection signal from the address event detection unit 260. The signal processing circuit 240 arranges the detection signals as pixel signals in a two-dimensional lattice pattern, and obtains image data having 2-bit information for each pixel. Then, the signal processing circuit 240 performs signal processing such as image recognition processing on the image data.

Figure 5:
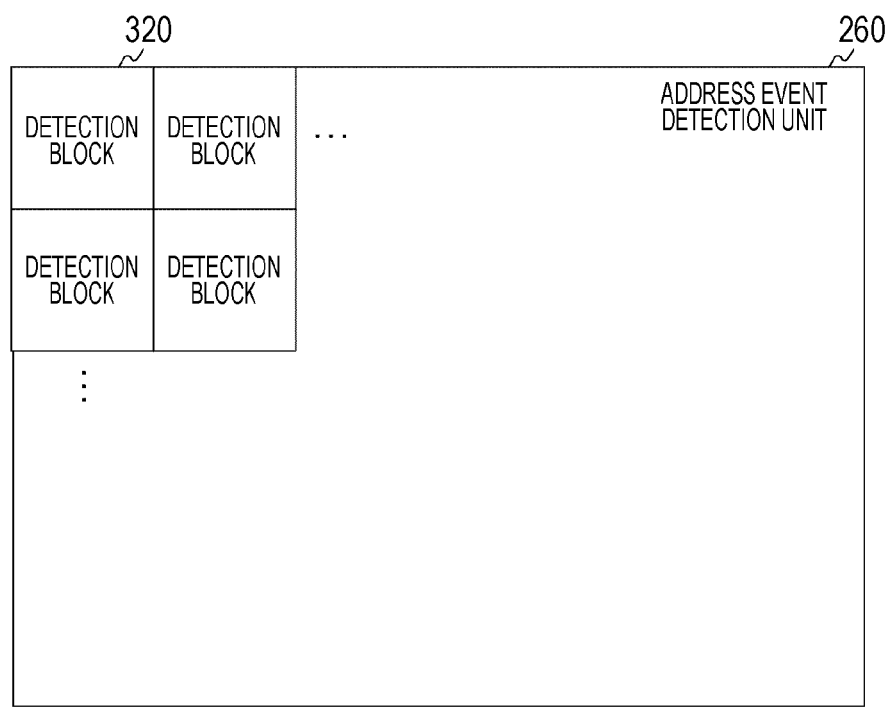
FIG. 5 is an exemplary plan view of an address event detection unit according to the first embodiment of the present technology.

FIG. 5 is an exemplary plan view of the address event detection unit 260 according to the first embodiment of the present technology. A plurality of detection blocks 320 is arranged in the address event detection unit 260. The detection block 320 is disposed for each of the shared blocks 221 on the light receiving chip 201. In a case where the number of the shared blocks 221 is N (N is an integer), the N detection blocks 320 are arranged. Each of the detection blocks 320 is connected to the corresponding shared block 221.

[Exemplary Configuration of Logarithmic Response Unit]

Figure 6:
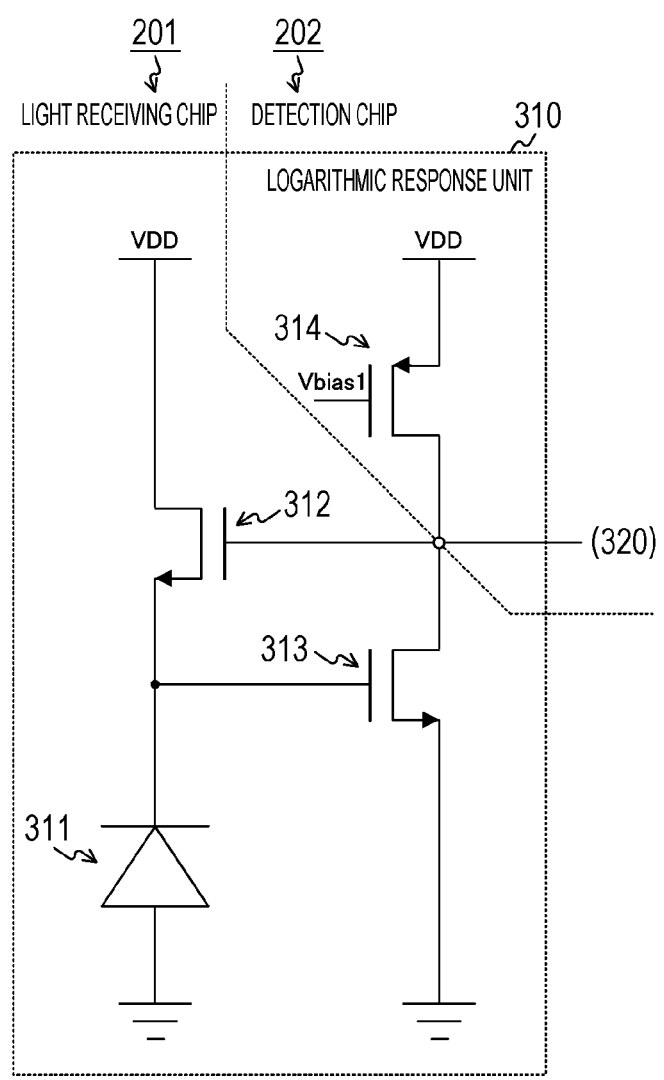
FIG. 6 is a circuit diagram illustrating an exemplary configuration of a logarithmic response unit according to the first embodiment of the present technology.

FIG. 6 is a circuit diagram illustrating an exemplary configuration of the logarithmic response unit 310 according to the first embodiment of the present technology. The logarithmic response unit 310 includes a photoelectric conversion element 311, n-channel metal oxide semiconductor (nMOS) transistors 312 and 313, and a p-channel MOS (pMOS) transistor 314. Among them, the photoelectric conversion element 311 and the nMOS transistors 312 and 313 are disposed on the light receiving chip 201, for example, and the pMOS transistor 314 is disposed on the detection chip 202.

The source of the nMOS transistor 312 is connected to the cathode of the photoelectric conversion element 311, and the drain is connected to the power supply terminal. The pMOS transistor 314 and the nMOS transistor 313 are connected in series between the power supply terminal and the ground terminal. Furthermore, the connection point of the pMOS transistor 314 and the nMOS transistor 313 is connected to the gate of the nMOS transistor 312 and the input terminal of the detection block 320. Furthermore, a predetermined bias voltage Vbias1 is applied to the gate of the pMOS transistor 314.

The drains of the nMOS transistors 312 and 313 are connected to the power supply side, and such a circuit is called a source follower. Those two source followers connected in the shape of a loop converts the photocurrent from the photoelectric conversion element 311 into voltage signals corresponding to the logarithmic value. Furthermore, the pMOS transistor 314 supplies a constant current to the nMOS transistor 313.

Furthermore, the ground of the light receiving chip 201 and the ground of the detection chip 202 are separated from each other as a countermeasure against interference.

[Exemplary Configuration of Detection Block]

Figure 7:
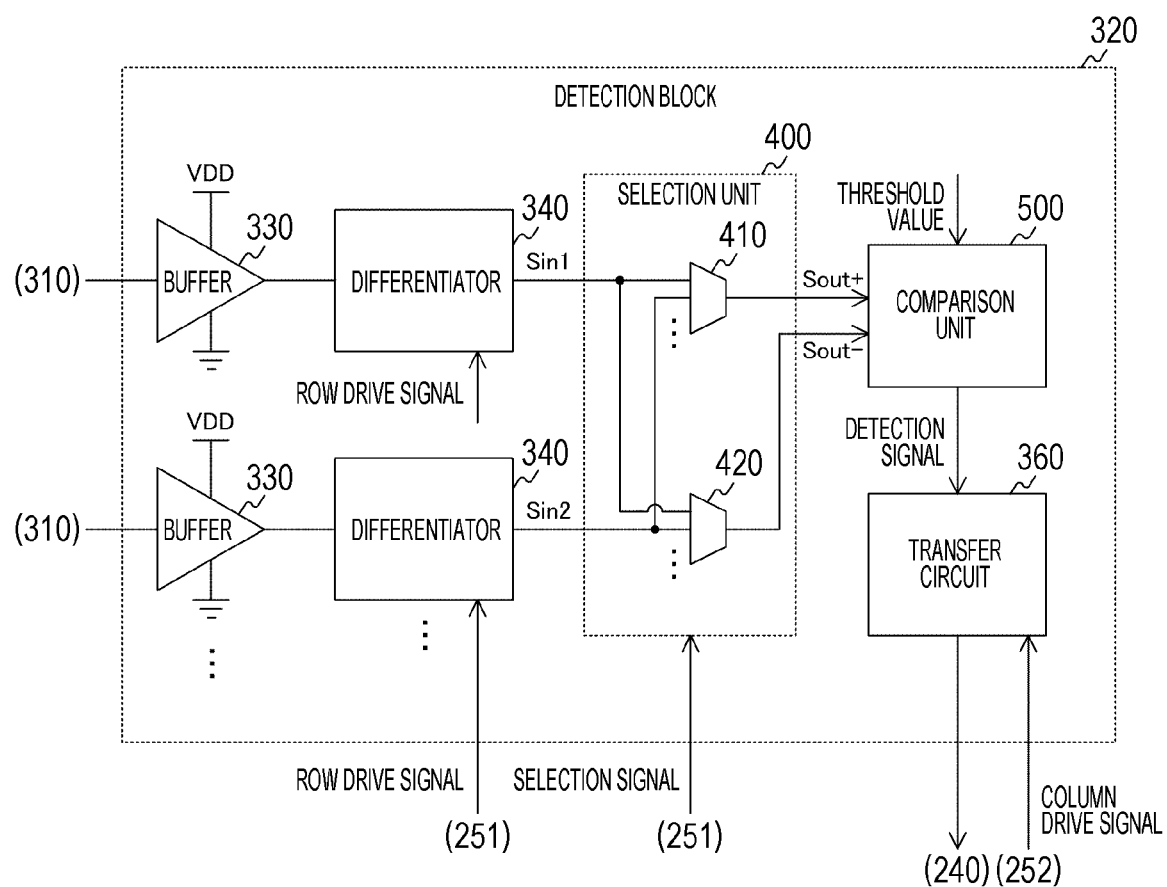
FIG. 7 is a block diagram illustrating an exemplary configuration of a detection block according to the first embodiment of the present technology.

FIG. 7 is a block diagram illustrating an exemplary configuration of the detection block 320 according to the first embodiment of the present technology. The detection block 320 includes a plurality of buffers 330, a plurality of differentiators 340, a selection unit 400, a comparison unit 500, and a transfer circuit 360. The buffer 330 and the differentiator 340 are disposed for each of the logarithmic response units 310 in the shared block 221. For example, in a case where the number of the logarithmic response units 310 in the shared block 221 is four, four buffers 330 and four differentiators 340 are disposed.

The buffer 330 outputs the voltage signals from the corresponding logarithmic response unit 310 to the differentiator 340. It is possible to improve driving force for driving the subsequent stage with the buffer 330. Furthermore, it is possible to ensure noise isolation associated with a switching operation in the subsequent stage with the buffer 330.

The differentiator 340 obtains a change amount of the voltage signals as differential signals. The differentiator 340 receives the voltage signals from the corresponding logarithmic response unit 310 via the buffer 330, and obtains a change amount of the voltage signals by differentiation. Then, the differentiator 340 supplies the differential signals to the selection unit 400. The m-th (m is an integer of 1 to M) differential signal Sin in the detection block 320 is set as Sinm.

The selection unit 400 selects any of the M differential signals according to a selection signal from the row driving circuit 251. The selection unit 400 includes selectors 410 and 420.

The M differential signals Sin are input to the selector 410. The selector 410 selects any of those differential signals Sin according to the selection signal, and supplies it to the comparison unit 500 as Sout+. The M differential signals Sin are also input to the selector 420. The selector 420 selects any of those differential signals Sin according to the selection signal, and supplies it to the comparison unit 500 as Sout−.

The comparison unit 500 compares the differential signals (i.e., change amount) selected by the selection unit 400 with a predetermined threshold value. The comparison unit 500 supplies, as detection signals, signals indicating a comparison result to the transfer circuit 360.

The transfer circuit 360 transfers the detection signals to the signal processing circuit 240 according to a column drive signal from the column driving circuit 252.

[Exemplary Configuration of Differentiator]

Figure 8:
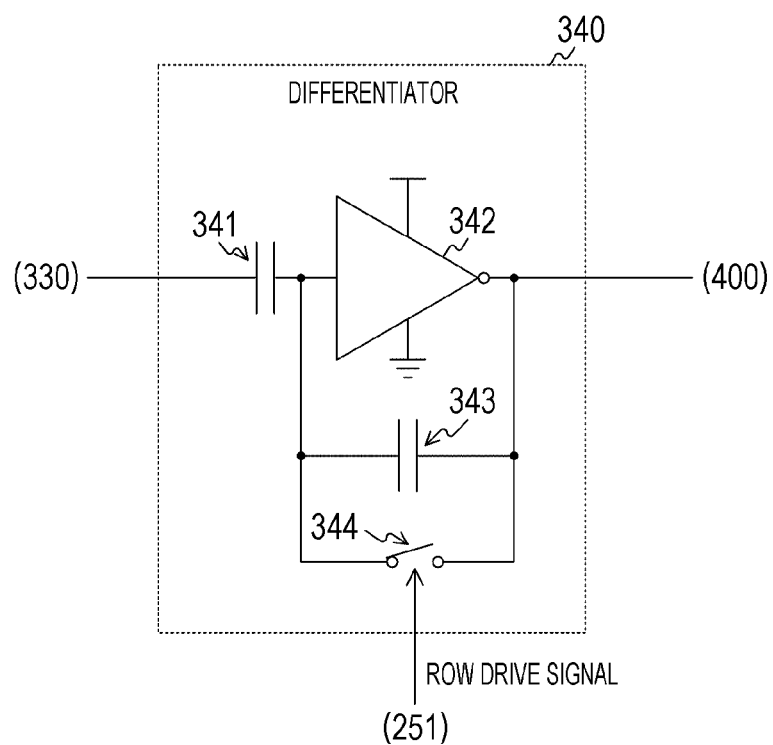
FIG. 8 is a circuit diagram illustrating an exemplary configuration of a differentiator according to the first embodiment of the present technology.

FIG. 8 is a circuit diagram illustrating an exemplary configuration of the differentiator 340 according to the first embodiment of the present technology. The differentiator 340 includes capacitors 341 and 343, an inverter 342, and a switch 344.

One end of the capacitor 341 is connected to the output terminal of the buffer 330, and the other end thereof is connected to the input terminal of the inverter 342. The capacitor 343 is connected in parallel with the inverter 342. The switch 344 opens and closes a path connecting both ends of the capacitor 343 according to a row drive signal.

The inverter 342 inverts the voltage signals input via the capacitor 341. The inverter 342 outputs the inverted signals to the selection unit 400.

When the switch 344 is turned on, a voltage signal $V_{init}$ is input to the side of the buffer 330 side of the capacitor 341, and the opposite side becomes a virtual ground terminal. The potential of the virtual ground terminal is set to zero for convenience. At this time, potential $Q_{init}$ accumulated in the capacitor 341 is expressed by the following formula, where the capacitance of the capacitor 341 is C1. Meanwhile, both ends of the capacitor 343 are short-circuited, and thus the accumulated charge is zero.

$$Q_{init} = C1 \times V_{init} \quad \text{Formula 1}$$

Next, considering a case where the switch 344 is turned off and the voltage on the buffer 330 side of the capacitor 341 changes to $V_{after}$, charge $Q_{after}$ accumulated in the capacitor 341 is expressed by the following formula.

$$Q_{after} = C1 \times V_{afer} \quad \text{Formula 2}$$

Meanwhile, charge Q2 accumulated in the capacitor 343 is expressed by the following formula, where the output voltage is $V_{out}$.

$$Q2 = -C2 \times V_{out} \quad \text{Formula 3}$$

At this time, the total charge amount of the capacitors 341 and 343 does not change, and thus the following formula is established.

$$Q_{init} = Q_{after} + Q2 \quad \text{Formula 4}$$

When the formulae 1 to 3 are substituted into the formula 4 and transformed, the following formula is obtained.

$$V_{out} = -(C1/C2) \times (V_{after} - V_{init}) \quad \text{Formula 5}$$

The formula 5 represents subtraction operation of voltage signals, and the gain of the subtraction result is C1/C2. Since it is generally desired to maximize the gain, it is preferable to design C1 to be large and C2 to be small. Meanwhile, since kTC noise increases and noise characteristics may deteriorate when C2 is too small, capacitance reduction of C2 is limited to a range in which noise can be tolerated. Furthermore, since the differentiator 340 is mounted for each pixel, the capacitances C1 and C2 have area restrictions. In consideration of the above, for example, C1 is set to a value of 20 to 200 femtofarad (fF), and C2 is set to a value of 1 to 20 femtofarad (fF).

[Exemplary Configuration of Comparison Unit]

Figure 9:
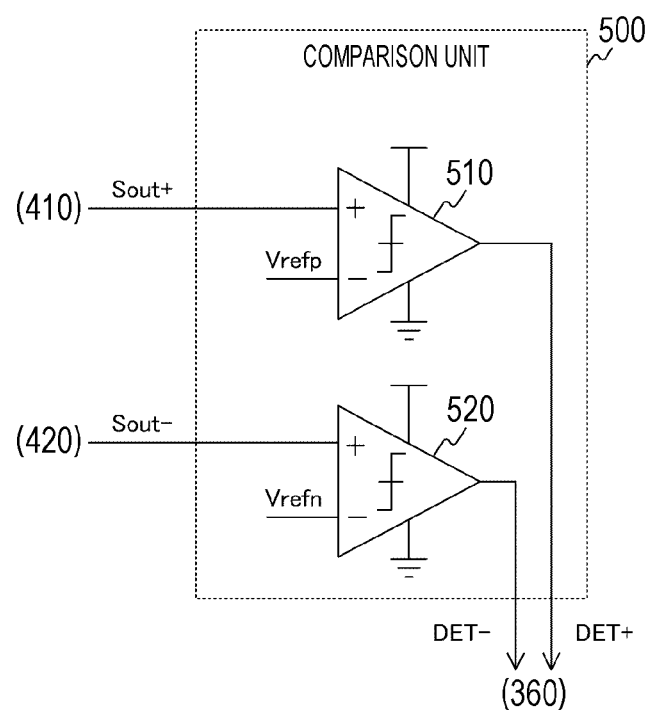
FIG. 9 is a circuit diagram illustrating an exemplary configuration of a comparison unit according to the first embodiment of the present technology.

FIG. 9 is a circuit diagram illustrating an exemplary configuration of the comparison unit 500 according to the first embodiment of the present technology. The comparison unit 500 includes comparators 510 and 520.

The comparator 510 compares the differential signal Sout+ from the selector 410 with a predetermined upper limit threshold value Vrefp. The comparator 510 supplies a comparison result to the transfer circuit 360 as a detection signal DET+. The detection signal DET+ indicates presence or absence of an on-event. Here, the on-event indicates that the change amount in luminance exceeds a predetermined upper limit threshold value.

The comparator 520 compares the differential signal Sout− from the selector 420 with a lower limit threshold value Vrefn lower than the upper limit threshold value Vrefp. The comparator 520 supplies a comparison result to the transfer circuit 360 as a detection signal DET−.

The detection signal DET− indicates presence or absence of an off-event. Here, the off-event indicates that the change amount in luminance is less than a predetermined lower limit threshold value. Note that, although the comparison unit 500 detects the presence or absence of both of the on-event and the off-event, it is also possible to detect only one of them.

Note that the comparator 510 is an example of an upper-limit-side comparator described in the claims, and the comparator 520 is an example of a lower-limit-side comparator described in the claims.

Figure 10:
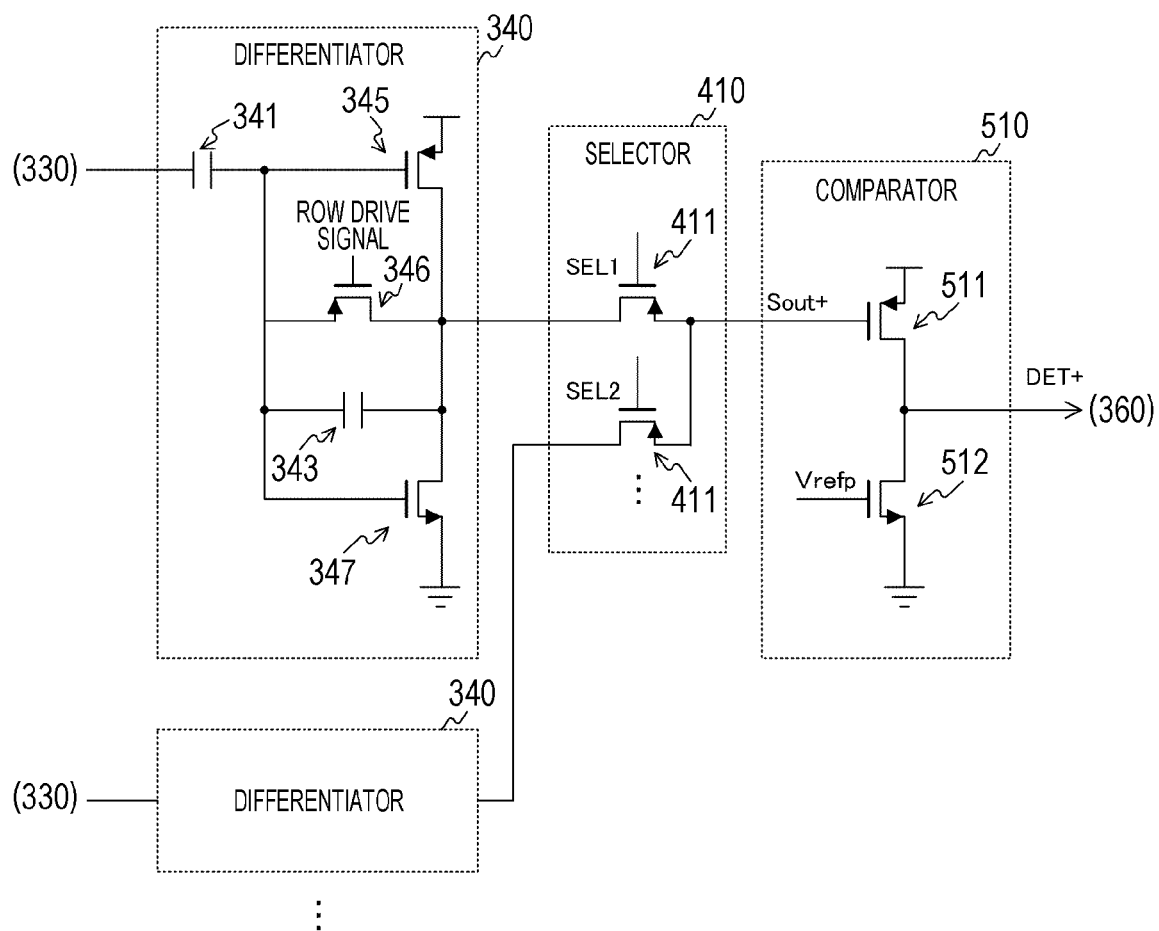
FIG. 10 is a circuit diagram illustrating an exemplary configuration of the differentiator, a selector, and a comparator according to the first embodiment of the present technology.

FIG. 10 is a circuit diagram illustrating an exemplary configuration of the differentiator 340, the selector 410, and the comparator 510 according to the first embodiment of the present technology.

The differentiator 340 includes the capacitors 341 and 343, pMOS transistors 345 and 346, and an nMOS transistor 347. The pMOS transistor 345 and the nMOS transistor 347 are connected in series between the power supply terminal and the ground terminal with the pMOS transistor 345 set on the power supply side. The capacitor 341 is inserted between the gate of the pMOS transistor 345 and nMOS transistor 347 and the buffer 330. The connection point of the pMOS transistor 345 and the nMOS transistor 347 is connected to the selector 410. With this connection configuration, the pMOS transistor 345 and the nMOS transistor 347 function as the inverter 342.

Furthermore, the capacitor 343 and the pMOS transistor 346 are connected in parallel between the connection point of the pMOS transistor 345 and the nMOS transistor 347 and the capacitor 341. The pMOS transistor 346 functions as the switch 344.

Furthermore, a plurality of pMOS transistors 411 is disposed in the selector 410. The pMOS transistor 411 is disposed for each of the differentiators 340.

The pMOS transistor 411 is inserted between the corresponding differentiator 340 and the comparator 510. Furthermore, a selection signal SEL is individually input to each of the gates of the pMOS transistors 411. The selection signal SEL of the m-th pMOS transistor 411 is set as SELm. According to those selection signals SEL, the row driving circuit 251 can control any of the M pMOS transistors 411 to be in an ON state, and control the others to be in an OFF state. Then, the differential signal Sout+ is output to the comparator 510 as a selected signal via the pMOS transistor 411 in the ON state. Note that the circuit configuration of the selector 420 is similar to that of the selector 410.

The comparator 510 includes a pMOS transistor 511 and an nMOS transistor 512. The pMOS transistor 511 and the nMOS transistor 512 are connected in series between the power supply terminal and the ground terminal. Furthermore, the differential signal Sout+ is input to the gate of the pMOS transistor 511, and the voltage of the upper limit threshold value Vrefp is input to the gate of the nMOS transistor 512. The detection signal DET+ is output from the connection point of the pMOS transistor 511 and the nMOS transistor 512. Note that the circuit configuration of the comparator 520 is similar to that of the comparator 510.

Note that the respective circuit configurations of the differentiator 340, the selector 410, and the comparator 510 are not limited to those exemplified in FIG. 10 as long as they have the functions described with reference to FIG. 7. For example, the nMOS transistor and the pMOS transistor may be exchanged.

Figure 11:
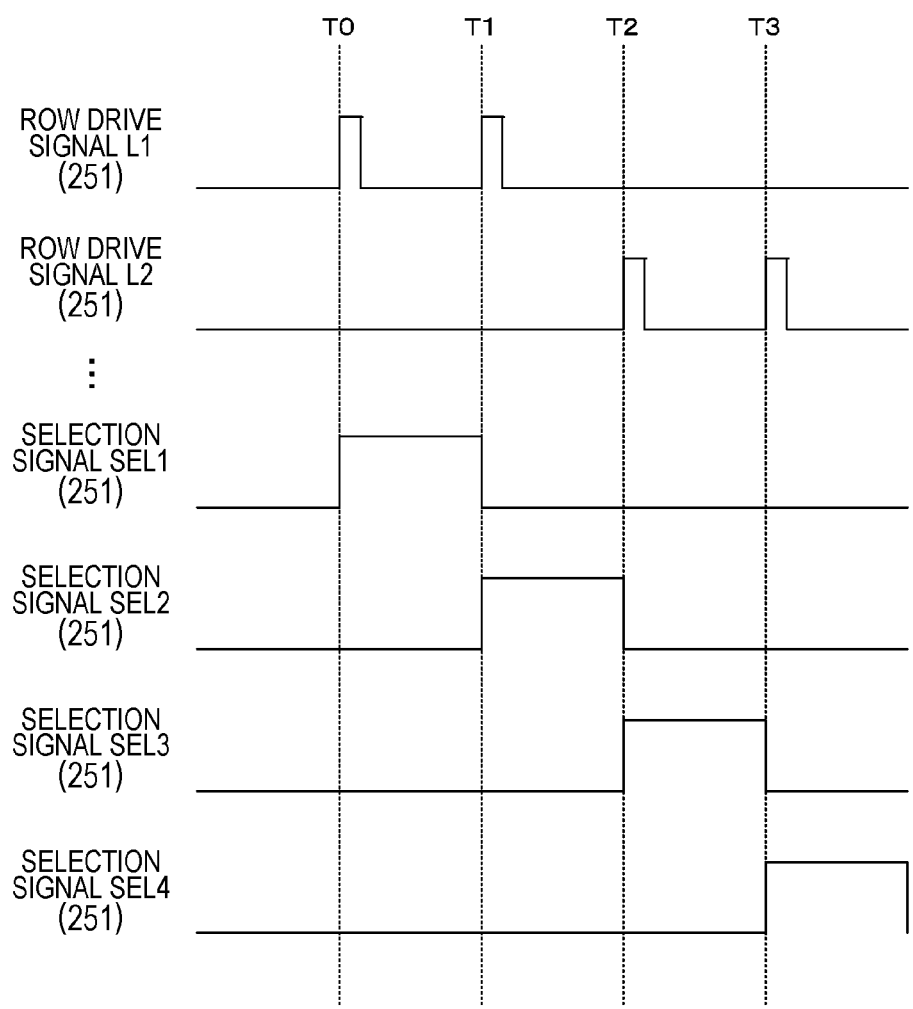
FIG. 11 is a timing chart illustrating exemplary control of a row driving circuit according to the first embodiment of the present technology.

FIG. 11 is a timing chart illustrating exemplary control of the row driving circuit 251 according to the first embodiment of the present technology. At timing T0, the row driving circuit 251 selects a first row with a row drive signal L1, and drives the differentiator 340 of the selected row. The capacitor 343 in the differentiator 340 of the first row is initialized by the row drive signal L1. Furthermore, the row driving circuit 251 selects, with a selection signal SEL1, the upper left of 2 rows×2 columns in the shared block 221 over a certain period of time, and drives the selection unit 400.

With this arrangement, the presence or absence of the address event is detected in the odd-numbered column of the first row.

Next, at timing T1, the row driving circuit 251 drives the differentiator 340 of the first row again with the row drive signal L1. Furthermore, the row driving circuit 251 selects, with a selection signal SEL2, the upper right of 2 rows×2 columns in the shared block 221 over a certain period of time. With this arrangement, the presence or absence of the address event is detected in the even-numbered column of the first row.

At timing T2, the row driving circuit 251 drives the differentiator 340 of the second row with a row drive signal L2. The capacitor 343 in the differentiator 340 of the second row is initialized by the row drive signal L2. Furthermore, the row driving circuit 251 selects, with a selection signal SEL3, the lower left of 2 rows×2 columns in the shared block 221 over a certain period of time. With this arrangement, the presence or absence of the address event is detected in the odd-numbered column of the second row.

Subsequently, at timing T3, the row driving circuit 251 drives the differentiator 340 of the second row again with the row drive signal L2. Furthermore, the row driving circuit 251 selects, with a selection signal SEL4, the lower right of 2 rows×2 columns in the shared block 221 over a certain period of time. With this arrangement, the presence or absence of the address event is detected in the even-numbered column of the second row.

Thereafter, the row driving circuit 251 sequentially selects the row in which the logarithmic response unit 310 is arranged, and drives the selected row with the row drive signal in a similar manner. Furthermore, each time the row driving circuit 251 selects a row, it sequentially selects each of detection pixels 300 in the shared block 221 of the selected row with the selection signal. For example, in a case where the detection pixels 300 of 2 rows×2 columns are arranged in the shared block 221, an odd-numbered column and an even-numbered column are sequentially selected each time a row is selected.

Note that the row driving circuit 251 may also sequentially select a row in which the shared block 221 is arranged (i.e., 2 rows of the logarithmic response unit 310). In this case, each time a row is selected, four detection pixels in the shared block 221 of the selected row are sequentially selected.

Figure 12:
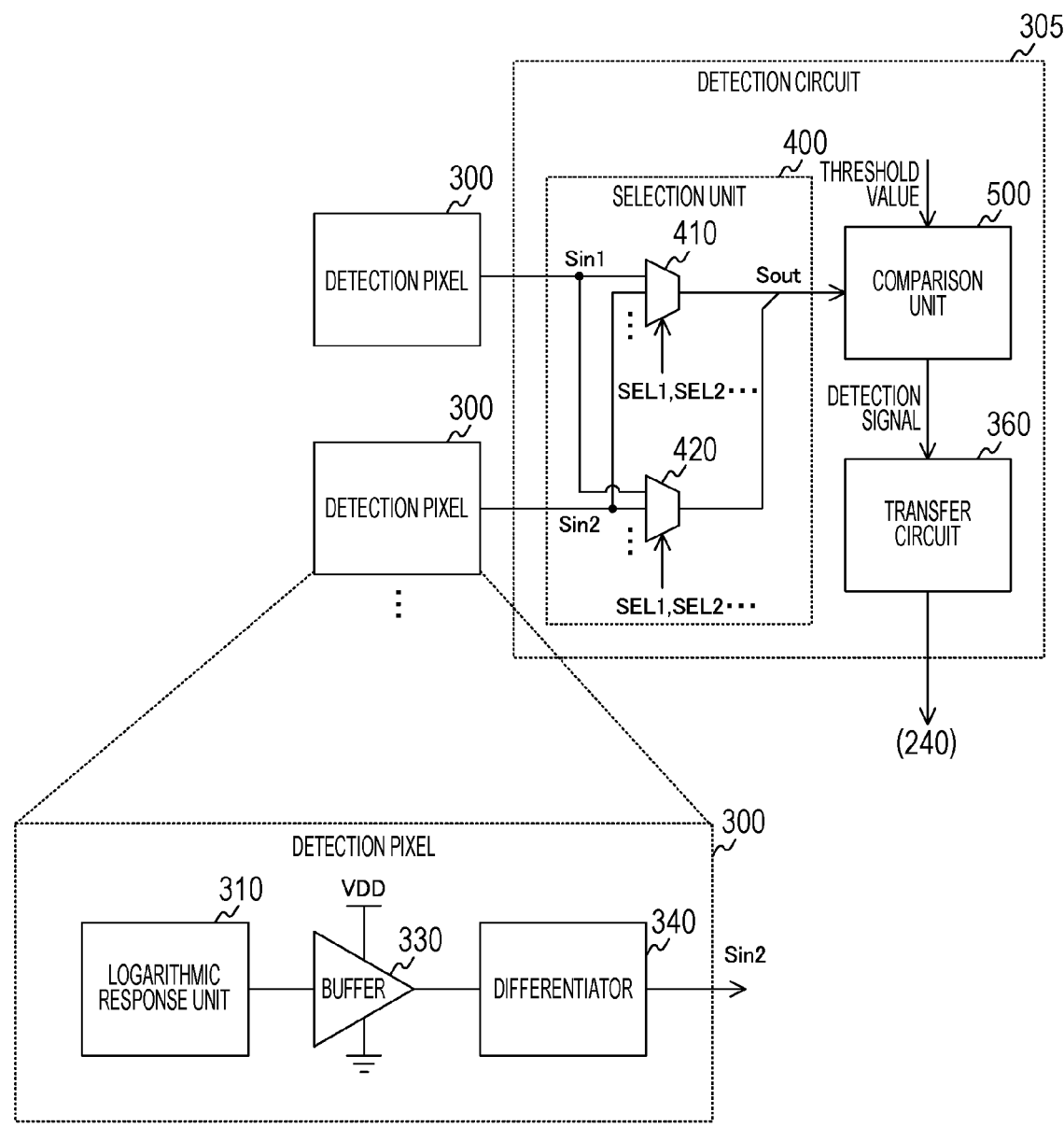
FIG. 12 is a block diagram illustrating an exemplary configuration of a detection pixel and a detection circuit according to the first embodiment of the present technology.

FIG. 12 is a block diagram illustrating an exemplary configuration of the detection pixels 300 and a detection circuit 305 according to the first embodiment of the present technology. Among the detection blocks 320 shared by the plurality of logarithmic response units 310 in the shared block 221, a circuit including the selection unit 400, the comparison unit 500, and the transfer circuit 360 is referred to as the detection circuit 305. Furthermore, a circuit including the logarithmic response unit 310, the buffer 330, and the differentiator 340 is referred to as the detection pixel 300. As exemplified in the drawing, the detection circuit 305 is shared by the plurality of detection pixels 300.

Each of the plurality of detection pixels 300 sharing the detection circuit 305 generates voltage signals corresponding to the logarithmic value of the photocurrent. Then, each of the detection pixels 300 outputs, to the detection circuit 305, the differential signal Sin indicating a change amount of the voltage signals according to the row drive signal. In each of the detection pixels 300, the logarithmic response unit 310 generates voltage signals corresponding to the logarithmic value, and the differentiator 340 generates differential signals.

The selection signals, such as the selection signals SEL1 and SEL2, are commonly input to the selectors 410 and 420 in the detection circuit 305. The detection circuit 305 selects, among the plurality of detection pixels 300, the differential signal of the detection pixel indicated by the selection signal (i.e., change amount), and detects whether or not the change amount exceeds a predetermined threshold value. Then, the detection circuit 305 transfers the detection signals to the signal processing circuit 240 according to the column drive signal. In the detection circuit 305, the selection unit 400 selects the differential signal, and the comparison unit 500 performs comparison with the threshold value. Furthermore, the transfer circuit 360 transfers the detection signals.

Here, in a general DVS, the comparison unit 500 and the transfer circuit 360 are disposed for each detection pixel together with the logarithmic response unit 310, the buffer 330, and the differentiator 340. Meanwhile, the configuration described above in which the plurality of detection pixels 300 shares the detection circuit 305 including the comparison unit 500 and the transfer circuit 360 can reduce the circuit scale of the solid-state imaging element 200 as compared with the case of not sharing it. This facilitates miniaturization of pixels.

In particular, in a case of adopting a laminated structure, the detection chip 202 has a circuit scale larger than that of the light receiving chip 201 in the general configuration in which the detection circuit 305 is not shared. Therefore, the density of pixels is limited by the circuit on the detection chip 202 side, whereby miniaturization of the pixels is difficult. However, with the detection circuit 305 shared by the plurality of detection pixels 300, it becomes possible to reduce the circuit scale of the detection chip 202, and to facilitate miniaturization of the pixels.

Note that, although the buffer 330 is disposed for each of the detection pixels 300, the configuration is not limited thereto, and the buffer 330 may not be provided.

Furthermore, although the photoelectric conversion element 311 and the nMOS transistors 312 and 313 of the logarithmic response unit 310 are disposed on the light receiving chip 201 and the pMOS transistor 314 and subsequent elements are disposed on the detection chip 202, the configuration is not limited thereto. For example, only the photoelectric conversion element 311 may be disposed on the light receiving chip 201, and the other elements may be disposed on the detection chip 202. Furthermore, only the logarithmic response unit 310 may be disposed on the light receiving chip 201, and the buffer 330 and subsequent elements may be disposed on the detection chip 202. Furthermore, the logarithmic response unit 310 and the buffer 330 may be disposed on the light receiving chip 201, and the differentiator 340 and subsequent elements may be disposed on the detection chip 202. Furthermore, the logarithmic response unit 310, the buffer 330, and the differentiator 340 may be disposed on the light receiving chip 201, and the detection circuit 305 and subsequent elements may be disposed on the detection chip 202. Furthermore, elements up to the selection unit 400 may be disposed on the light receiving chip 201, and the comparison unit 500 and subsequent elements may be disposed on the detection chip 202.

[Exemplary Operation of Solid-State Imaging Element]

Figure 13:
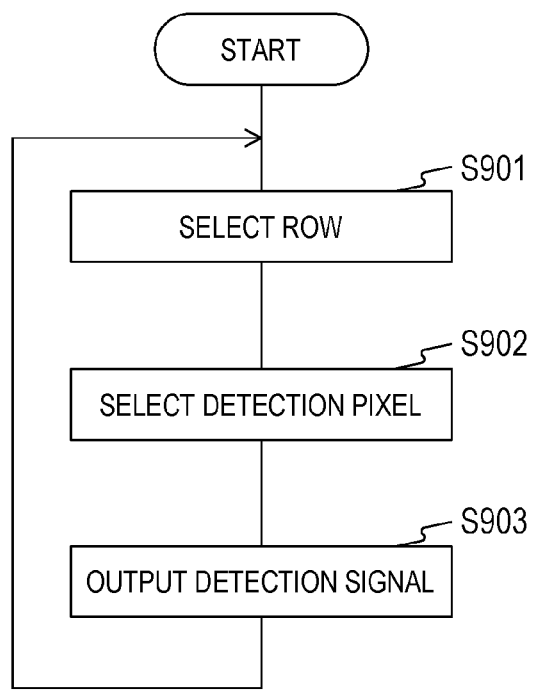
FIG. 13 is a flowchart illustrating exemplary operation of the solid-state imaging element according to the first embodiment of the present technology.

FIG. 13 is a flowchart illustrating exemplary operation of the solid-state imaging element 200 according to the first embodiment of the present technology. This operation starts when, for example, a predetermined application for detecting presence or absence of an address event is executed.

The row driving circuit 251 selects one of the rows (step S901). Then, the row driving circuit 251 selects and drives any of the detection pixels 300 in each of the shared blocks 221 in the selected row (step S902). The detection circuit 305 detects presence or absence of an address event in the selected detection pixel 300 (step S903). After step S903, the solid-state imaging element 200 repeatedly executes step S901 and subsequent steps.

As described above, according to the first embodiment of the present technology, a plurality of detection pixels 300 shares the detection circuit 305 for detecting presence or absence of an address event, whereby the circuit scale can be reduced as compared with a case of not sharing the detection circuit 305. This facilitates miniaturization of the detection pixel 300.

[Variations]

In the first embodiment described above, the solid-state imaging element 200 selects detection pixels one by one, and simultaneously detects an on-event and off-event for the detection pixel. However, the solid-state imaging element 200 may also select two detection pixels to detect an on-event for one of them and detect an off-event for the other one. A solid-state imaging element 200 according to a variation of the first embodiment is different from that of the first embodiment in that an on-event is detected for one of two detection pixels and an off-event is detected for the other one.

Figure 14:
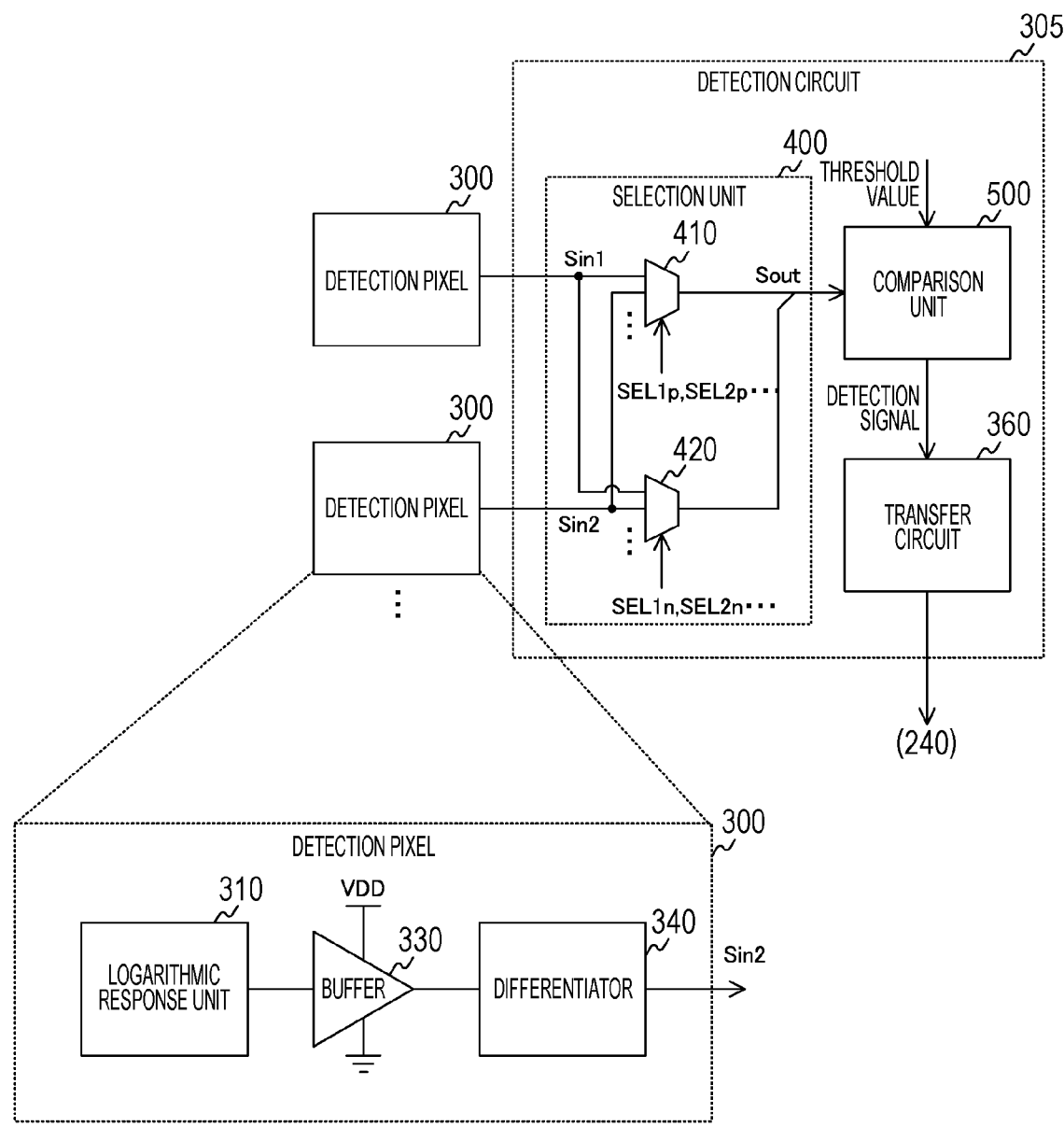
FIG. 14 is a block diagram illustrating an exemplary configuration of a detection pixel and a detection circuit according to a variation of the first embodiment of the present technology.

FIG. 14 is a block diagram illustrating an exemplary configuration of a detection pixel 300 and a detection circuit 305 according to the variation of the first embodiment of the present technology. The detection circuit 305 according to the variation of the first embodiment is different from that of the first embodiment in that selection signals such as a selection signals SEL1$p$ and SEL2$p$ are input to a selector 410 and selection signals such as selection signals SEL1$n$ and SEL2$n$ are input to a selector 420. In the variation of the first embodiment, two detection pixels 300 are selected, and the selector 410 selects a differential signal of one of them according to the selection signals SEL1$p$, SEL2$p$, and the like. At the same time, the selector 420 selects a differential signal of the other one according to the selection signals SEL1$n$, SEL2$n$, and the like.

Figure 15:
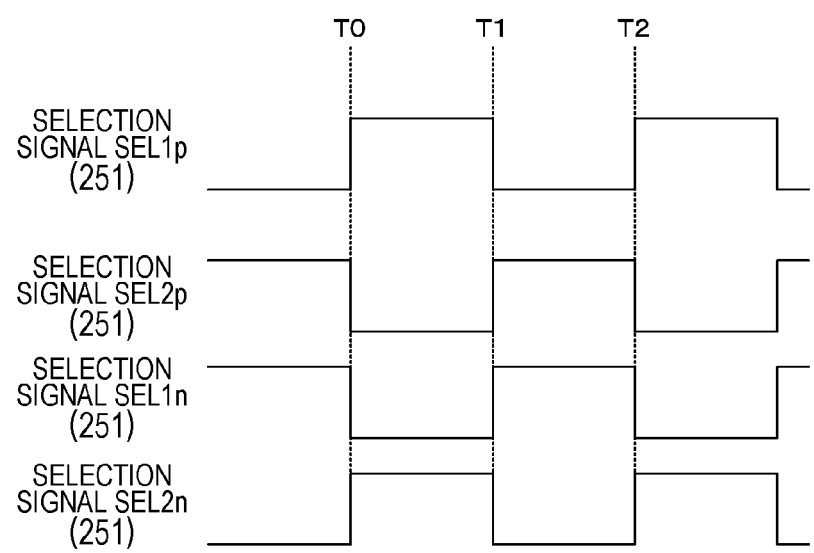
FIG. 15 is a timing chart illustrating exemplary control of a row driving circuit according to the variation of the first embodiment of the present technology.

FIG. 15 is a timing chart illustrating exemplary control of a row driving circuit 251 according to the variation of the first embodiment of the present technology. It is assumed that two detection pixels including the detection pixel 300 that outputs a differential signal Sin1 and the detection pixel 300 that outputs a differential signal Sin2 are selected at timings T0 to T2. At timings T0 to T1, the row driving circuit 251 sets the selection signals SEL1$p$ and SEL2$n$ to a high level, and sets the selection signals SEL2$p$ and SEL1$n$ to a low level. With this arrangement, an on-event is detected for the pixel corresponding to the differential signal Sin1, and an off-event is detected for the pixel corresponding to the differential signal Sin2.

Then, at timings T1 to T2, the row driving circuit 251 sets the selection signals SEL1$p$ and SEL2$n$ to a low level, and sets the selection signals SEL2$p$ and SEL1$n$ to a high level. With this arrangement, an on-event is detected for the pixel corresponding to the differential signal Sin2, and an off-event is detected for the pixel corresponding to the differential signal Sin1.

As described above, according to the variation of the first embodiment of the present technology, an on-event is detected for one of two detection pixels and an off-event is detected for the other one, whereby it becomes possible to detect the on-event and the off-event in a spatially parallel manner at the same time.

2. Second Embodiment

While the plurality of detection pixels 300 shares the comparison unit 500 and the transfer circuit 360 in the first embodiment described above, the circuit scale increases as the number of pixels increases. A solid-state imaging element 200 according to a second embodiment is different from that of the first embodiment in that a plurality of detection pixels 300 shares a differentiator 340 in addition to a comparison unit 500 and a transfer circuit 360 to reduce the circuit scale.

Figure 16:
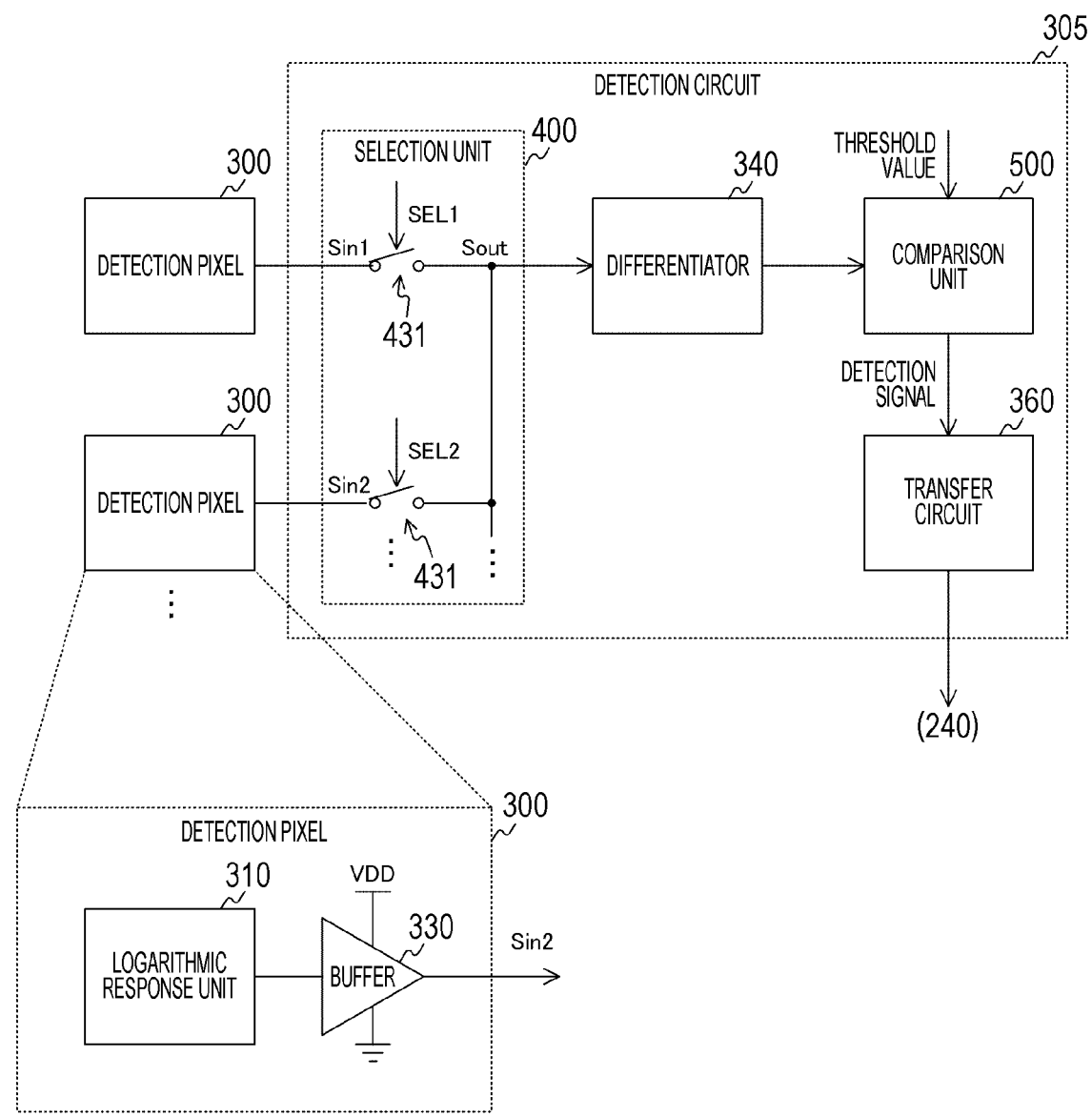
FIG. 16 is a block diagram illustrating an exemplary configuration of a detection pixel and a detection circuit according to a second embodiment of the present technology.

FIG. 16 is a block diagram illustrating an exemplary configuration of the detection pixels 300 and a detection circuit 305 according to the second embodiment of the present technology. The detection circuit 305 according to the second embodiment is different from that of the first embodiment in that a differentiator 340 is further included. Meanwhile, each of the detection pixels 300 according to the second embodiment does not include the differentiator 340.

Furthermore, a selection unit 400 according to the second embodiment includes a plurality of switches 431. The switch 431 is disposed for each of the detection pixels 300. The switch 431 opens and closes a path between the corresponding detection pixel 300 and the differentiator 340 according to selection signals SEL. Any of voltage signals of each of the plurality of detection pixels 300 is selected by those switches 431. The differentiator 340 in the subsequent stage obtains a change amount of the selected voltage signals, and outputs it to the comparison unit 500.

As exemplified in the drawing, since the plurality of detection pixels 300 shares the differentiator 340 in addition to the comparison unit 500 and the transfer circuit 360, it becomes possible to reduce the circuit scale of the detection circuit 305 as compared with the case of not sharing the differentiator 340.

As described above, according to the second embodiment of the present technology, the plurality of detection pixels 300 further shares the differentiator 340, whereby it becomes possible to reduce the circuit scale of the detection circuit 305 as compared with the first embodiment in which the differentiator 340 is not shared.

3. Third Embodiment

While the differentiator 340 retains only the change amount of the selected detection pixel 300 in the second embodiment described above, with this configuration, an address event may not be detected when the address event occurs in an unselected detection pixel 300. A solid-state imaging element 200 according to a third embodiment is different from that of the second embodiment in that a change amount of an unselected detection pixel 300 is also retained to suppress detection omission of an address event.

Figure 17:
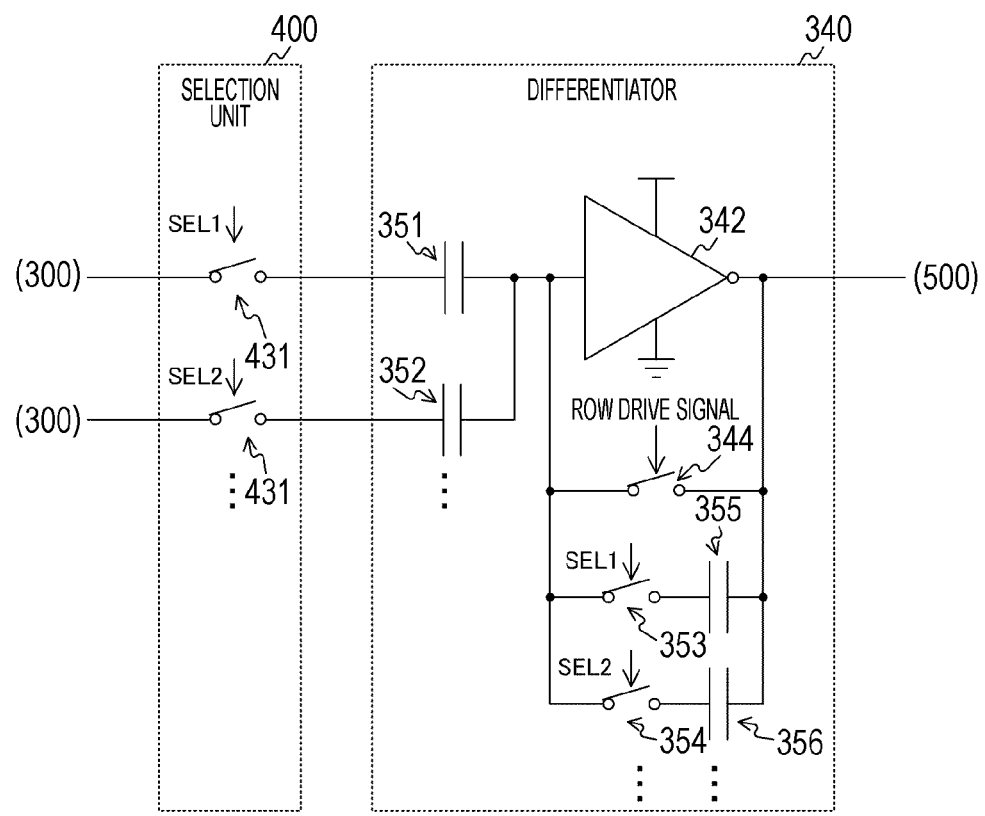
FIG. 17 is a circuit diagram illustrating an exemplary configuration of a differentiator according to a third embodiment of the present technology.

FIG. 17 is a circuit diagram illustrating an exemplary configuration of a differentiator 340 according to the third embodiment of the present technology. In the differentiator 340 according to the third embodiment, a plurality of capacitors such as capacitors 351 and 352 is provided in place of a capacitor 341 on the preceding stage side. Those capacitors are disposed for each detection pixel 300. Furthermore, on the subsequent stage side, a plurality of switches such as switches 353 and 354 and a plurality of capacitors such as capacitors 355 and 356 are provided in place of a capacitor 343. Those capacitors and switches are disposed for each detection pixel 300. In the drawing, capacitors and switches corresponding to the third and subsequent detection pixels 300 are omitted.

One end of each of the capacitors 351 and 352 on the preceding stage side is connected to a corresponding switch 431, and the other end is commonly connected to the input terminal of an inverter 342. The switch 353 and the capacitor 355 are connected in series between the input terminal and the output terminal of the inverter 342. The switch 354 and the capacitor 356 are also connected in series between the input terminal and the output terminal of the inverter 342. The connection configuration of the switch 344 is similar to that of the first embodiment.

The row driving circuit 251 opens and closes the switch 353 with a selection signal SEL1, and opens and closes the switch 354 with a selection signal SEL2. The third and subsequent switches are also opened and closed by a selection signal SEL3 and subsequent signals in a similar manner.

Note that, although the switch 431 for selection is disposed between a logarithmic response unit 310 and a capacitor (capacitor 351, etc.) on the preceding stage side, the switch 431 may be disposed between those capacitors and the logarithmic response unit 310.

Figure 18:
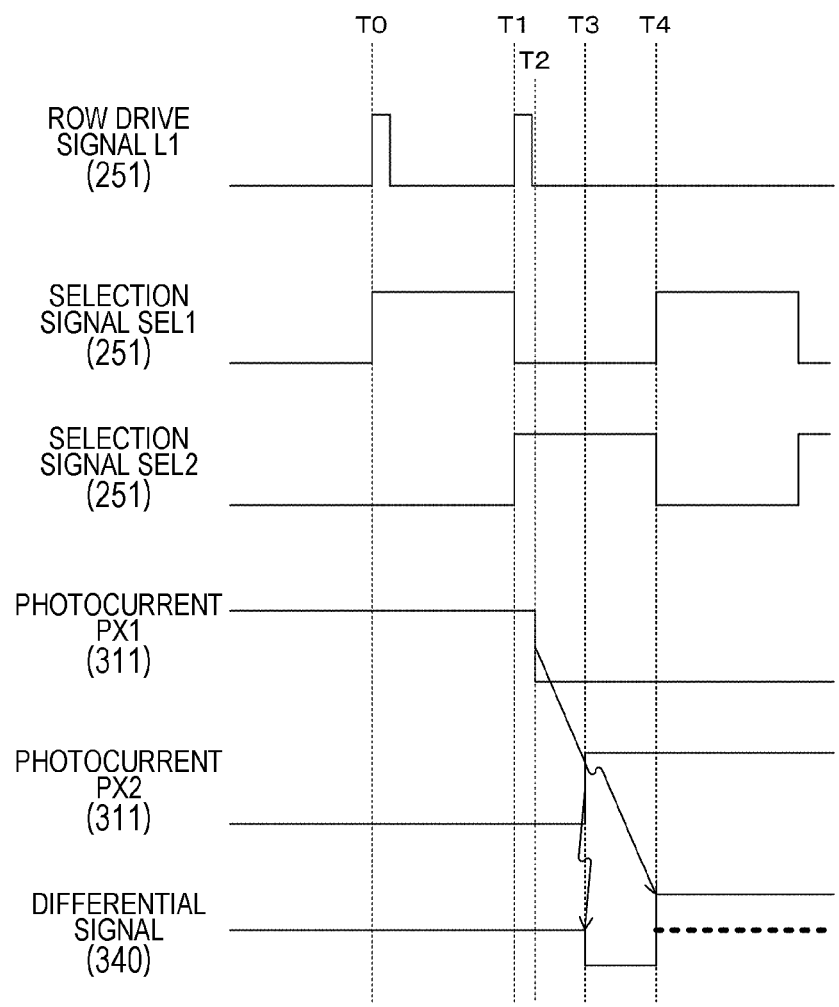
FIG. 18 is a timing chart illustrating exemplary operation of a solid-state imaging element according to the third embodiment of the present technology.

FIG. 18 is a timing chart illustrating exemplary operation of the solid-state imaging element 200 according to the third embodiment of the present technology.

The row driving circuit 251 supplies a row drive signal L1 over a predetermined pulse period from timing T0. With this arrangement, the capacitor 355 in the first row is initialized. Furthermore, the row driving circuit 251 selects, with the selection signal SEL1, the upper left (odd-numbered column) of 2 rows×2 columns in a shared block 221 over a certain period of time. It is assumed that there is no change in a photocurrent PX1 of a photoelectric conversion element 311 in the odd-numbered column in the selection period of the odd-numbered column in the first row. Therefore, differential signals of the differentiator 340 in the first row remains at the intermediate potential, and no address event is detected.

Then, the row driving circuit 251 supplies the row drive signal L1 again over the pulse period from timing T1. Furthermore, the row driving circuit 251 selects, with the selection signal L2, the upper right (even-numbered column) of 2 rows×2 columns in the shared block 221 over a certain period of time.

It is assumed that, at timing T2 in the selection period of the even-numbered column in the first row, there is a change in the photocurrent PX1 in the unselected odd-numbered column, and the level decreases. Meanwhile, it is assumed that, at timing T3 in the selection period, there is also a change in a photocurrent PX2 in the selected even-numbered column, and the level increases. The differentiator 340 retains a change amount of the selected photocurrent PX2 with the capacitors 352 and 356, and outputs a differential signal at a level lower than the intermediate potential. With this arrangement, an off-event is detected for the detection pixel 300 in the selected even-numbered column.

The row driving circuit 251 selects, with the selection signal L1, the odd-numbered column again over a certain period of time from timing T4 at which the selection period of the even-numbered column has elapsed. However, the row drive signal L1 is not supplied in the selection period. The differentiator 340 retains, with the capacitors 351 and 355 in the differentiator 340, the change amount of the photocurrent PX1 generated in the period in which the odd-numbered column is not selected, and outputs differential signals at a level higher than the intermediate potential. With this arrangement, an on-event that has occurred in the unselected period is detected for the detection pixel 300 in the odd-numbered column.

Here, in a case where only the capacitors 341 and 343 are provided in the differentiator 340 as in the first embodiment, detection omission of an address event occurs even when the control exemplified in the drawing is performed. In the configuration of the first embodiment, charges according to a change in the photocurrent PX2 are retained in the capacitors 341 and 343 during the period from the timing T2 to the timing T4. Since those capacitors are not reset at the timing T4, the change amount of the photocurrent PX1 generated at the timing T2 is not retained after the timing T4, and the differential signals do not change sufficiently. A thick dotted line in the drawing indicates a level of the differential signals in the first embodiment. As a result, with the configuration of the first embodiment, even when an address event in the unselected period occurs, detection thereof may fail.

Meanwhile, according to the third embodiment, the capacitor is provided for each of the detection pixels 300, whereby the change amount can be retained for each of the detection pixels 300. With this arrangement, as exemplified in the drawing, it becomes possible to suppress detection omission of an address event in the unselected period.

Note that the second row is selected after the second selection period of the odd-numbered column in the first row has elapsed. The control of the second and subsequent rows is similar to that of the first row.

As described above, according to the third embodiment of the present technology, the differentiator 340 retains the change amount of each of the plurality of detection pixels 300, it becomes possible to suppress detection omission of an address event.

4. Fourth Embodiment

While both the comparator 510 for detecting an on-event and the comparator 520 for detecting an off-event are disposed in the comparison unit 500 in the first embodiment described above, with this configuration, the circuit scale increases as the number of pixels increases. A solid-state imaging element 200 according to a fourth embodiment is different from that of the first embodiment in that a switch for switching a threshold value is added and a comparator is reduced.

Figure 19:
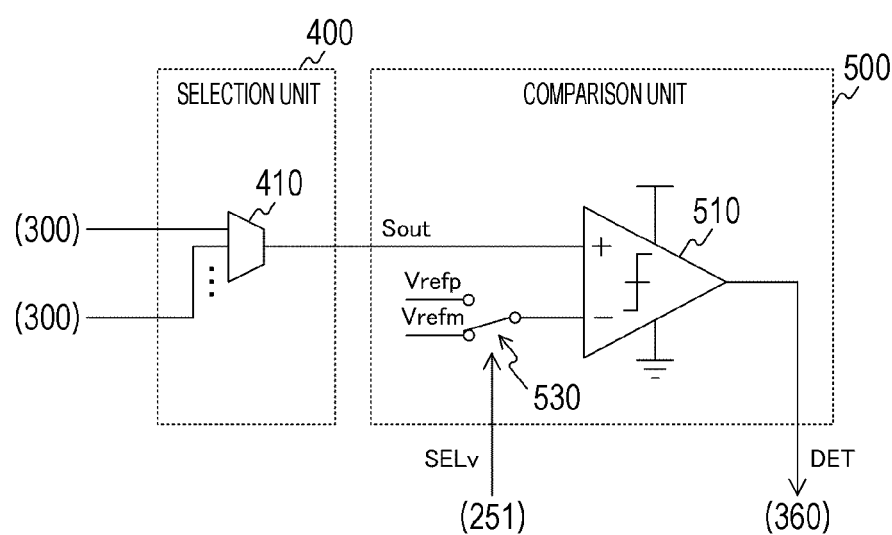
FIG. 19 is a circuit diagram illustrating an exemplary configuration of a comparison unit according to a fourth embodiment of the present technology.

FIG. 19 is a circuit diagram illustrating an exemplary configuration of a comparison unit 500 according to the fourth embodiment of the present technology. The comparison unit 500 according to the fourth embodiment is different from that of the first embodiment in that a switch 530 is provided instead of the comparator 520. Furthermore, a selection unit 400 according to the fourth embodiment is different from that of the first embodiment in that a selector 420 is not disposed.

The switch 530 selects either an upper limit threshold value Vrefp or a lower limit threshold value Vrefn according to a selection signal SELv, and supplies it to a comparator 510. Then, the comparator 510 compares the selected threshold value with a differential signal Sout from a selector 410.

Each time a detection pixel 300 is selected, a row driving circuit 251 sequentially selects the upper limit threshold value Vrefp and the lower limit threshold value Vrefn with the selection signal SELv. Furthermore, the comparator 510 outputs a detection signal DET+ indicating presence or absence of an on-event when the upper limit threshold value Vrefp is selected, and outputs a detection signal DET− indicating presence or absence of an off-event when the lower limit threshold value Vrefn is selected.

As exemplified in the drawing, the switch 530 switches the threshold value and supplies it to the comparator 510, whereby it is not required to dispose the comparator 520 and the circuit scale of the comparison unit 500 can be reduced.

Note that the solid-state imaging element 200 according to the fourth embodiment can also adopt those of the second and third embodiments.

As described above, according to the fourth embodiment of the present technology, the switch 530 selects either the upper limit threshold value or the lower limit threshold value and supplies it to the comparator 510, whereby the comparator 520 can be reduced. With this arrangement, it becomes possible to reduce the circuit scale of a detection circuit 305.

5. Fifth Embodiment

In the first embodiment described above, the pMOS transistor 411 for selecting a differential signal is disposed in the preceding stage of the comparators 510 and 520. However, the pMOS transistor for selecting a differential signal may be disposed in the comparator. A solid-state imaging element 200 according to a fifth embodiment is different from that of the first embodiment in that a pMOS transistor for selecting a differential signal is disposed in a comparator.

Figure 20:
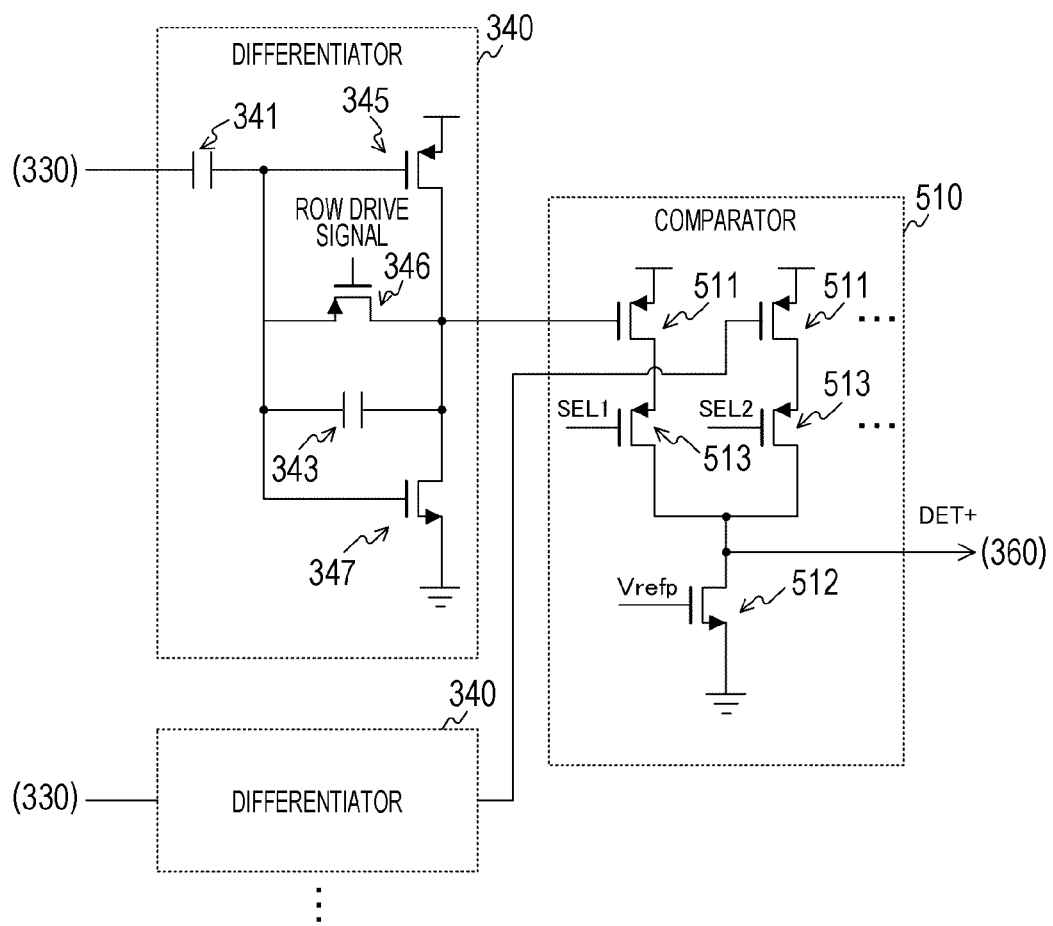
FIG. 20 is a circuit diagram illustrating an exemplary configuration of a differentiator and a comparator according to a fifth embodiment of the present technology.

FIG. 20 is a circuit diagram illustrating an exemplary configuration of a differentiator 340 and a comparator 510 according to the fifth embodiment of the present technology. The comparator 510 according to the fifth embodiment includes a plurality of pMOS transistors 511, a plurality of pMOS transistors 513, and an nMOS transistor 512.

Each of the pMOS transistors 511 and 513 is disposed for each differentiator 340. In a case where a detection pixel 300 of 2 rows×2 columns is arranged in a shared block 221, four sets of the pMOS transistors 511 and 513 are provided. Those four sets are connected in parallel between the power supply terminal and the nMOS transistor 512. Furthermore, in each of the sets, the pMOS transistors 511 and 513 are connected in series. A differential signal from the corresponding differentiator 340 is input to the gate of the pMOS transistor 511. A selection signal SEL of the corresponding detection pixel 300 is input to the gate of the pMOS transistor 513.

Note that the circuit configuration of the comparator 520 is similar to that of the comparator 510.

With the circuit configuration exemplified in the drawing, the comparator 510 selects any of the differential signals (change amounts) of the plurality of differentiators 340 according to the selection signal SEL, and compares the change amount with a threshold value. The comparator 520 operates in a similar manner.

Note that the solid-state imaging element 200 according to the fifth embodiment can also adopt those of the second to fourth embodiments.

As described above, according to the fifth embodiment of the present technology, the pMOS transistor 513 for selecting a differential signal is disposed in the comparator 510, whereby it is not required to dispose a selection unit 400 in the preceding stage of the comparator 510.

6. Sixth Embodiment

While the detection pixels 300 are disposed to detect presence or absence of an address event for each pixel in the first embodiment described above, it is not possible to generate a pixel signal according to an exposure amount. A solid-state imaging element 200 according to a sixth embodiment is different from that of the first embodiment in that gradation pixels for generating pixel signals according to an exposure amount are further disposed.

Figure 21:
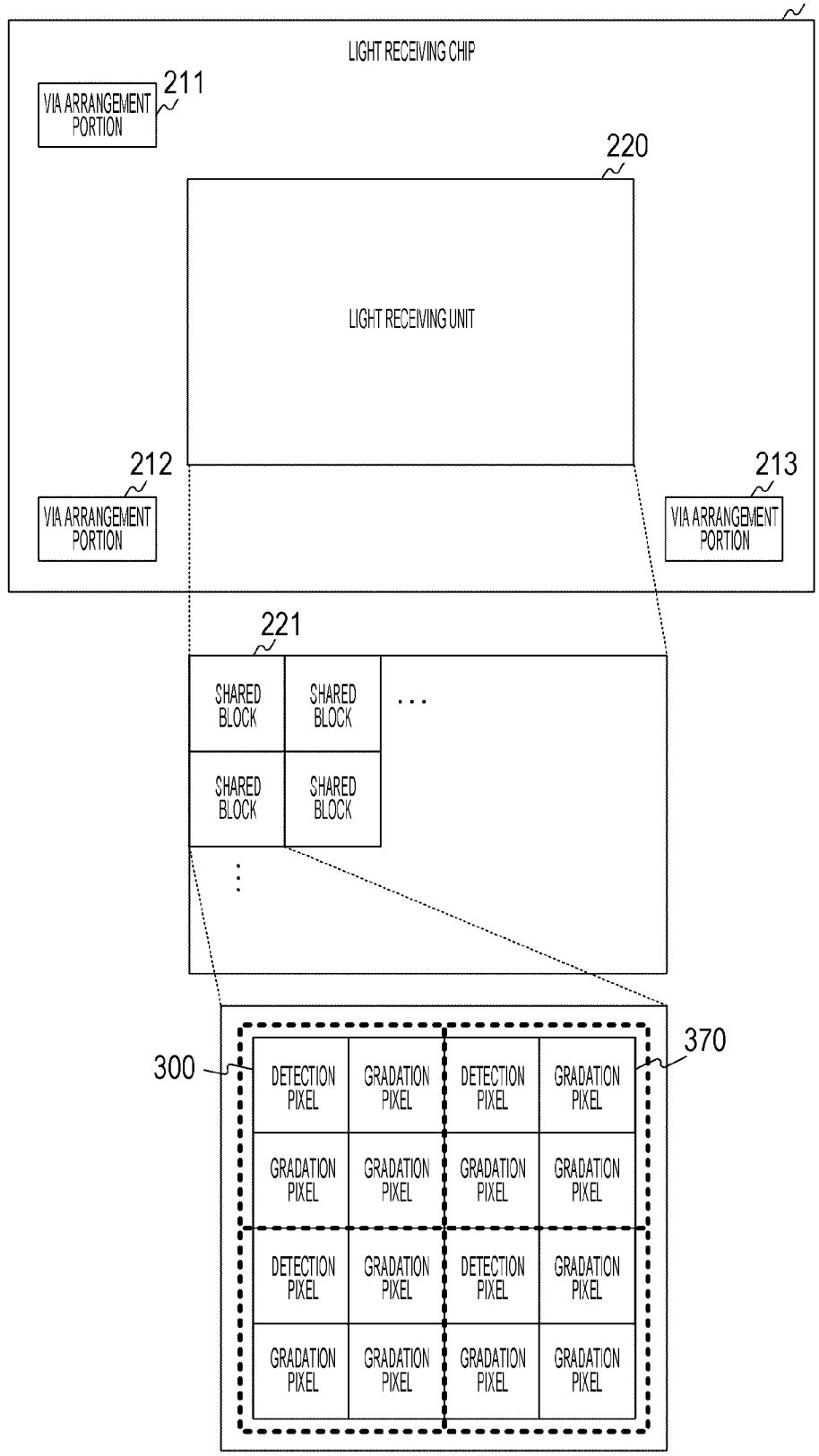
FIG. 21 is an exemplary plan view of a light receiving chip according to a sixth embodiment of the present technology.

FIG. 21 is an exemplary plan view of a light receiving chip 201 according to the sixth embodiment of the present technology. The light receiving chip 201 according to the sixth embodiment is different from that of the first embodiment in that gradation pixels 370 are further disposed in a shared block 221.

Furthermore, the shared block 221 is divided into a plurality of detection areas. An area surrounded by a thick dotted line in the drawing indicates a detection area. A plurality of the gradation pixels 370 and one detection pixel 300 are disposed in each of the detection area. For example, 2 rows×2 columns of pixels are disposed in the detection area, one of which is the detection pixel 300 and the remaining three are the gradation pixels 370. A plurality of the detection pixels 300 in the shared block 221 shares a detection circuit 305 in a similar manner to the first embodiment.

Note that, while only a part of a logarithmic response unit 310 of a circuit in the detection pixel 300 is disposed in the light receiving chip 201, technically, the detection pixel 300 is illustrated in the light receiving chip 201 in the drawing for convenience of explanation.

The gradation pixel 370 generates an analog signal corresponding to the exposure amount as a pixel signal.

A row driving circuit 251 sequentially drives the rows of the detection pixel 300, for example. Then, in a case where there is the detection pixel 300 in which an address event has occurred, the three gradation pixels 370 in the detection area corresponding to the detection pixel 300 are driven to output a pixel signal.

Figure 22:
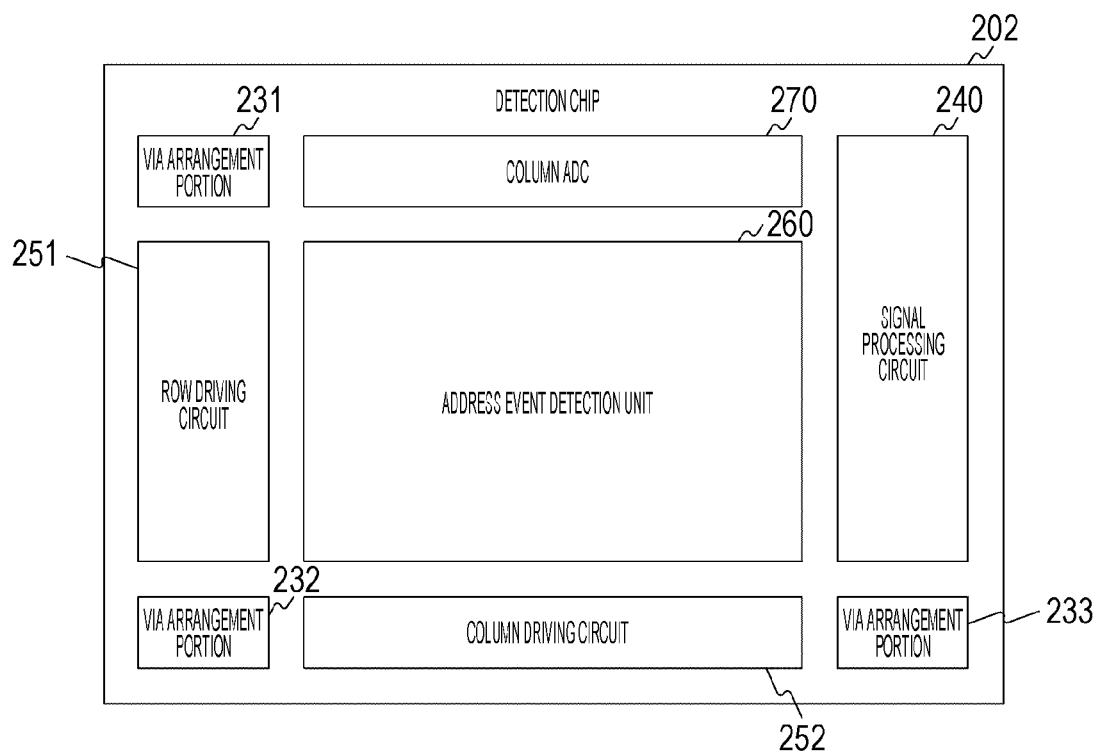
FIG. 22 is an exemplary plan view of a detection chip according to the sixth embodiment of the present technology.

FIG. 22 is an exemplary plan view of a detection chip 202 according to the sixth embodiment of the present technology. The detection chip 202 according to the sixth embodiment is different from that of the first embodiment in that a column analog to digital converter (ADC) 270 is further disposed.

Each of the gradation pixels 370 supplies an analog pixel signal to the column ADC 270 under the control of the row driving circuit 251. The column ADC 270 performs analog to digital (AD) conversion on the pixel signal for each pixel. The column ADC 270 supplies digital signals after the AD conversion to a signal processing circuit 240. The signal processing circuit 240 performs predetermined image processing on image data including those digital signals.

Figure 23:
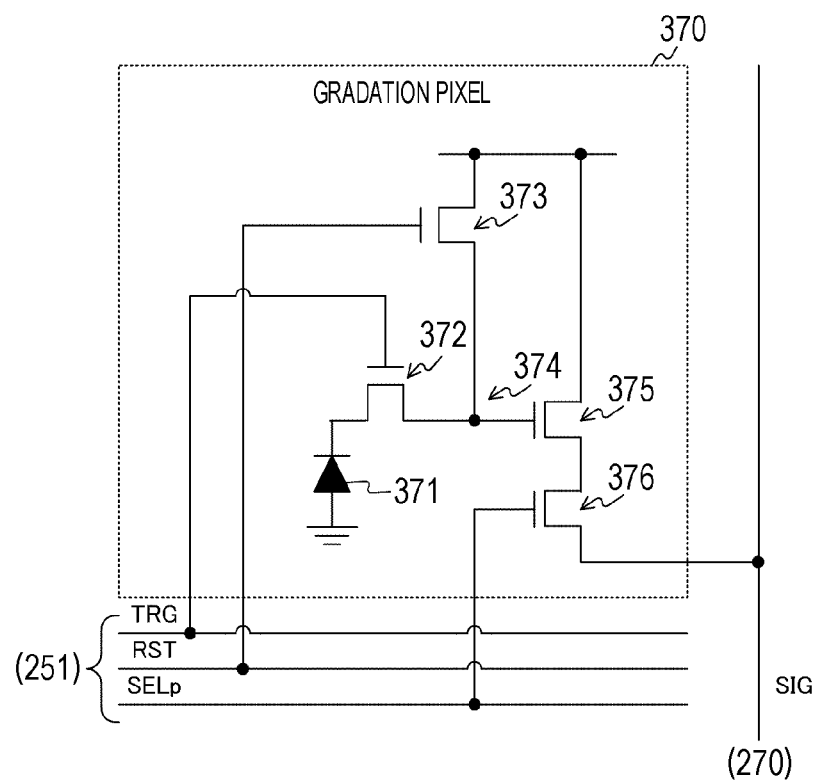
FIG. 23 is a circuit diagram illustrating an exemplary configuration of a gradation pixel according to the sixth embodiment of the present technology.

FIG. 23 is a circuit diagram illustrating an exemplary configuration of the gradation pixel 370 according to the sixth embodiment of the present technology. The gradation pixel 370 includes a photoelectric conversion element 371, a transfer transistor 372, a reset transistor 373, a floating diffusion layer 374, an amplification transistor 375, and a selection transistor 376.

The photoelectric conversion element 371 generates a charge by photoelectric conversion. The transfer transistor 372 transfers the charge from the photoelectric conversion element 371 to the floating diffusion layer 374 according to a selection signal SELp from the row driving circuit 251.

The reset transistor 373 extracts, according to a reset signal RST from the row driving circuit 251, the charge from the floating diffusion layer 374, and initializes it. The floating diffusion layer 374 accumulates the transferred charges, and generates a voltage corresponding to the charge amount.

The amplification transistor 375 amplifies the voltage of the floating diffusion layer 374. The selection transistor 376 supplies a signal of the amplified voltage to the column ADC 270 as a pixel signal SIG according to the selection signal SELp from the row driving circuit 251. The pixel signal SIG is converted into a digital signal having a bit depth larger than that of the detection signal. For example, when the detection signal is 2 bits, the pixel signal SIG is converted into a digital signal of equal to or more than 3 bits (16 bits, etc.). With this arrangement, the signal processing circuit 240 is enabled to obtain an image with a larger information amount for the area where the address event has occurred.

Note that the solid-state imaging element 200 according to the sixth embodiment can also adopt those of the second to fifth embodiments.

As described above, according to the sixth embodiment of the present technology, the gradation pixel 370 for generating pixel signals corresponding to the exposure amount is further disposed, whereby it becomes possible to obtain an image with a larger information amount for the area where the address event has occurred.

7. Seventh Embodiment

While the comparators 510 and 520 are disposed in the comparison unit 500 in the first embodiment described above, it is also possible to dispose two-stage elements in the comparison unit 510 and share the elements in the subsequent stage. A seventh embodiment is different from the first embodiment in that two-stage elements are disposed in a comparison unit 510 and elements in the subsequent stage are shared.

Figure 24:
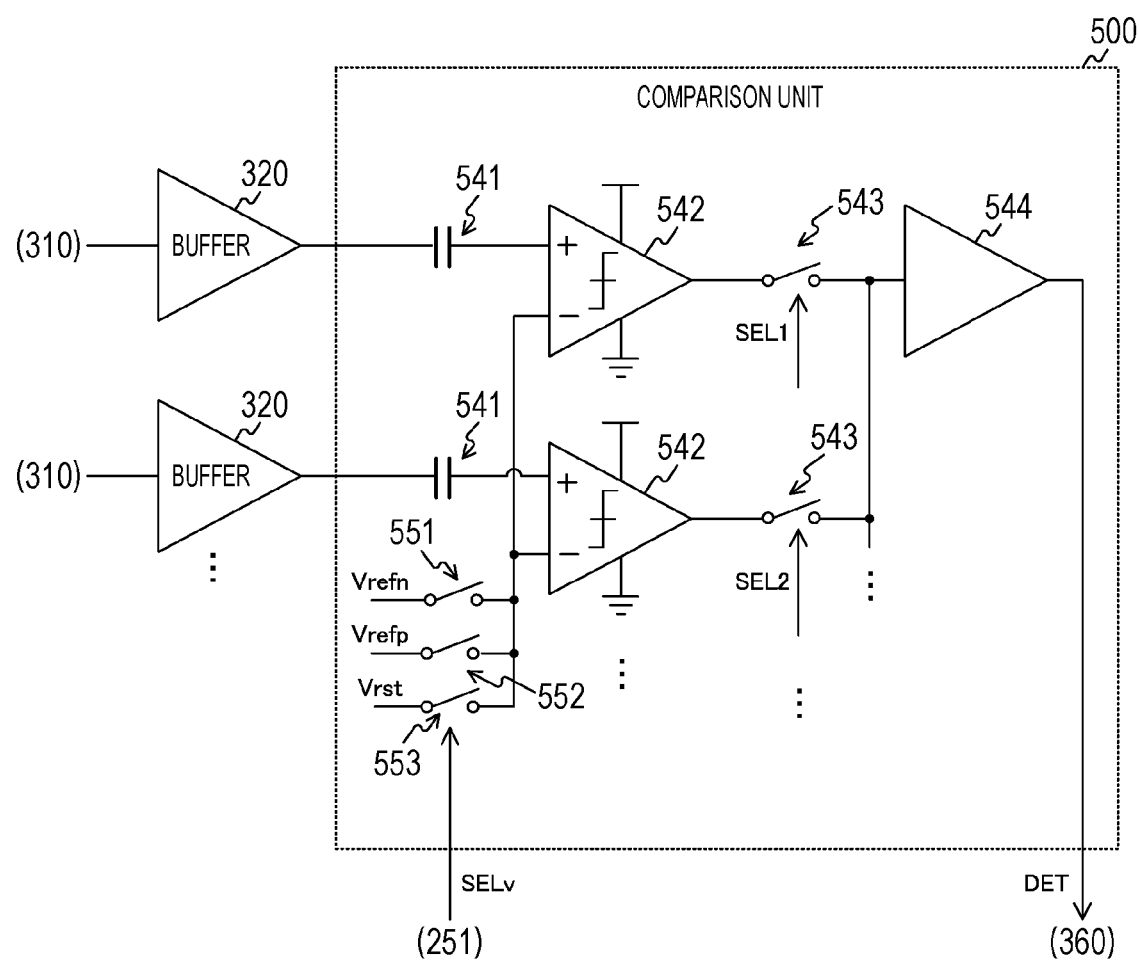
FIG. 24 is a circuit diagram illustrating an exemplary configuration of a comparison unit according to a seventh embodiment of the present technology.

FIG. 24 is a circuit diagram illustrating an exemplary configuration of the comparison unit 500 according to the seventh embodiment of the present technology. In the comparison unit 500 according to the seventh embodiment, a plurality of pieces of capacitance 541, a plurality of comparators 542, a plurality of switches 543, a buffer 544, and switches 551 to 553 are disposed. The capacitance 541, the comparator 542, and the switch 543 are disposed for each detection pixel 300. Furthermore, a differentiator 340 is not disposed in the detection pixel 300 in the seventh embodiment.

The capacitance 541 is inserted between the corresponding buffer 320 and the non-inverting input terminal (+) of the comparator 542. The switch 543 opens and closes a path between the output terminal of the corresponding comparator 542 and the buffer 544 according to the corresponding selection signal SEL. The switches 551 to 553 supply any of an upper limit threshold value Vrefp, a lower limit threshold value Vrefn, or a reset voltage Vrst to the inverting input terminal (−) of each of the comparators 542 according to a selection signal SELv. As exemplified in the drawing, the plurality of detection pixels 300 shares the subsequent stage of the two stages of the buffer 544 and the comparator 542.

As described above, according to the seventh embodiment of the present technology, the buffer 544 in the subsequent stage of the two stages of the comparator 542 and the buffer 544 is shared, whereby it becomes possible to reduce the circuit scale as compared with the case of not being shared.

8. Applications to Mobile Body

The technology according to the present disclosure (present technology) may be applied to various products. For example, the technology according to the present disclosure may be implemented as a device to be mounted on any type of mobile body such as a vehicle, electric vehicle, hybrid electric vehicle, motorcycle, bicycle, personal mobility, airplane, drone, ship, and robot.

Figure 25:
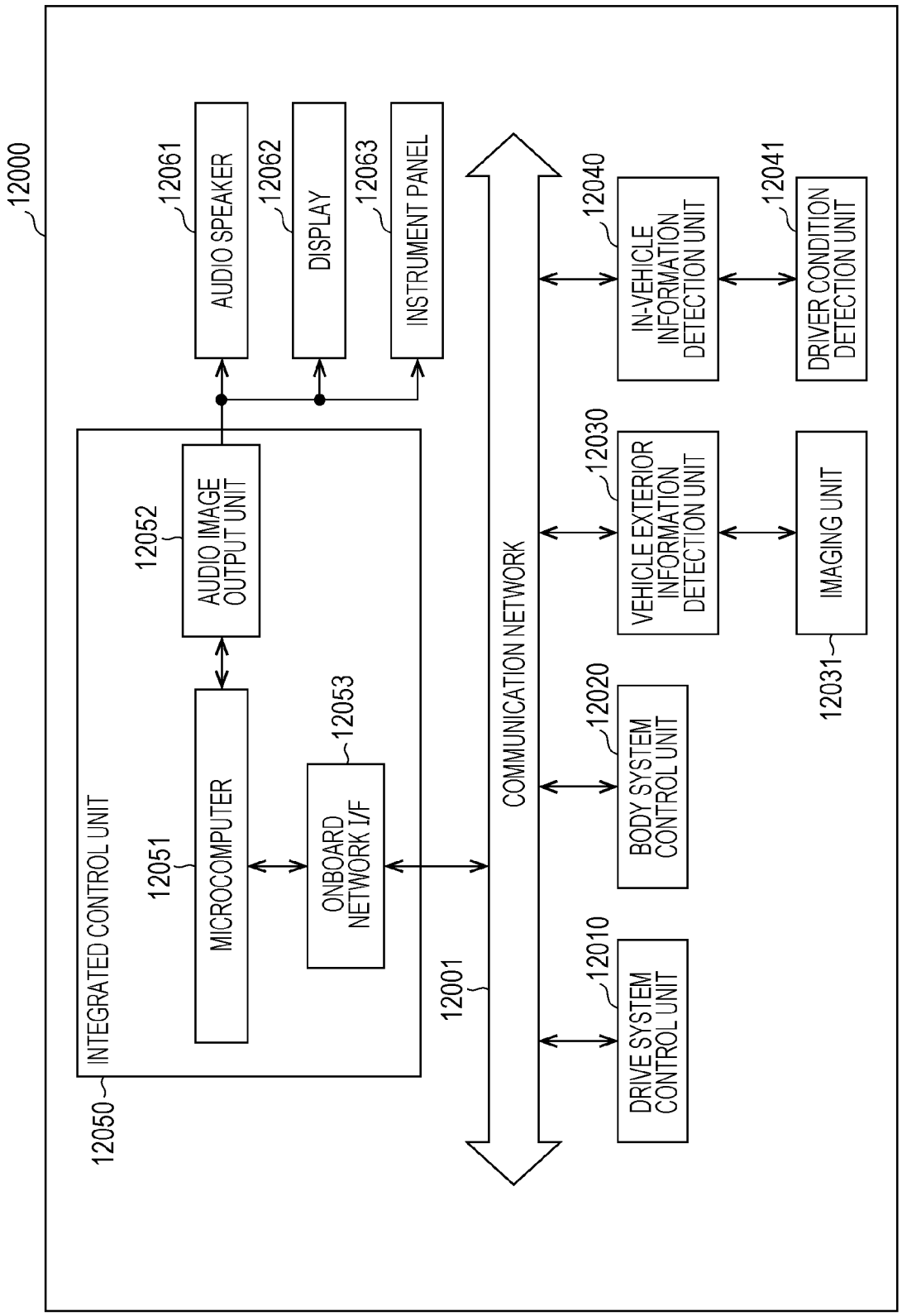
FIG. 25 is a block diagram illustrating an exemplary schematic configuration of a vehicle control system.

FIG. 25 is a block diagram illustrating a schematic exemplary configuration of a vehicle control system as an example of a mobile body control system to which the technology according to the present disclosure may be applied.

A vehicle control system 12000 includes a plurality of electronic control units connected via a communication network 12001. In the example illustrated in FIG. 25, the vehicle control system 12000 includes a drive system control unit 12010, a body system control unit 12020, a vehicle exterior information detection unit 12030, an in-vehicle information detection unit 12040, and an integrated control unit 12050. Furthermore, as a functional configuration of the integrated control unit 12050, a microcomputer 12051, an audio image output unit 12052, and an onboard network interface (I/F) 12053 are illustrated in the drawing.

The drive system control unit 12010 controls operation of a device related to a drive system of a vehicle according to various programs. For example, the drive system control unit 12010 functions as a control device of a driving force generation device for generating driving force of a vehicle such as an internal-combustion engine and a driving motor, a driving force transmission mechanism for transmitting driving force to wheels, a steering mechanism for adjusting a steering angle of a vehicle, a braking device for generating braking force of a vehicle, and the like.

The body system control unit 12020 controls operation of various devices installed on a vehicle body according to various programs. For example, the body system control unit 12020 functions as a control device of a keyless entry system, a smart key system, a power window device, or various lamps such as a head lamp, a back lamp, a brake lamp, a turn indicator, and a fog lamp. In this case, radio waves transmitted from a portable device substituted for a key or signals of various switches may be input to the body system control unit 12020. The body system control unit 12020 receives input of those radio waves or signals, and controls a door lock device, a power window device, a lamp, and the like of a vehicle.

The vehicle exterior information detection unit 12030 detects information regarding the outside of the vehicle on which the vehicle control system 12000 is installed. For example, an imaging unit 12031 is connected to the vehicle exterior information detection unit 12030. The vehicle exterior information detection unit 12030 causes the imaging unit 12031 to capture an image of the outside of the vehicle, and receives the captured image. The vehicle exterior information detection unit 12030 may perform, on the basis of the received image, detection processing of an object such as a person, a vehicle, an obstacle, a sign, and a character on a road, or distance detection processing.

The imaging unit 12031 is an optical sensor that receives light and outputs electric signals corresponding to the amount of the received light. The imaging unit 12031 may output the electric signals as an image, or as information regarding the distance measurement. Furthermore, the light received by the imaging unit 12031 may be visible light, or may be invisible light such as infrared rays.

The in-vehicle information detection unit 12040 detects information regarding the inside of the vehicle. For example, a driver condition detection unit 12041 for detecting condition of a driver is connected to the in-vehicle information detection unit 12040. The driver condition detection unit 12041 includes, for example, a camera for imaging the driver, and the in-vehicle information detection unit 12040 may calculate a fatigue degree or a concentration degree of the driver or may determine whether or not the driver is dozing off on the basis of the detected information input from the driver condition detection unit 12041.

The microcomputer 12051 is capable of calculating a control target value of the driving force generation device, the steering mechanism, or the braking device on the basis of the information regarding the outside/inside of the vehicle obtained by the vehicle exterior information detection unit 12030 or the in-vehicle information detection unit 12040, and outputting a control command to the drive system control unit 12010. For example, the microcomputer 12051 is capable of performing cooperative control aiming at implementation of a function of the advanced driver assistance system (ADAS) including collision avoidance or impact mitigation of the vehicle, following travel based on the distance between vehicles, vehicle speed maintenance travelling, vehicle collision warning, vehicle lane departure warning, and the like.

Furthermore, the microcomputer 12051 controls the driving force generation device, the steering mechanism, the braking device, or the like on the basis of the information regarding the surroundings of the vehicle obtained by the vehicle exterior information detection unit 12030 or the in-vehicle information detection unit 12040, whereby cooperative control aiming at autonomous driving for autonomously travelling without being dependent on the operation of the driver and the like can be performed.

Furthermore, the microcomputer 12051 is capable of outputting a control command to the body system control unit 12020 on the basis of the information regarding the outside of the vehicle obtained by the vehicle exterior information detection unit 12030. For example, the microcomputer 12051 is capable of performing cooperative control aiming at anti-glaring such as switching from the high beam to the low beam by controlling the head lamp according to the position of a leading vehicle or an oncoming vehicle detected by the vehicle exterior information detection unit 12030.

The audio image output unit 12052 transmits output signals of at least one of a sound or an image to an output device capable of visually or audibly notifying an occupant of the vehicle or the outside of the vehicle of information. In the example of FIG. 22, an audio speaker 12061, a display 12062, and an instrument panel 12063 are exemplified as the output device. The display 12062 may include, for example, at least one of an onboard display or a head-up display.

Figure 26:
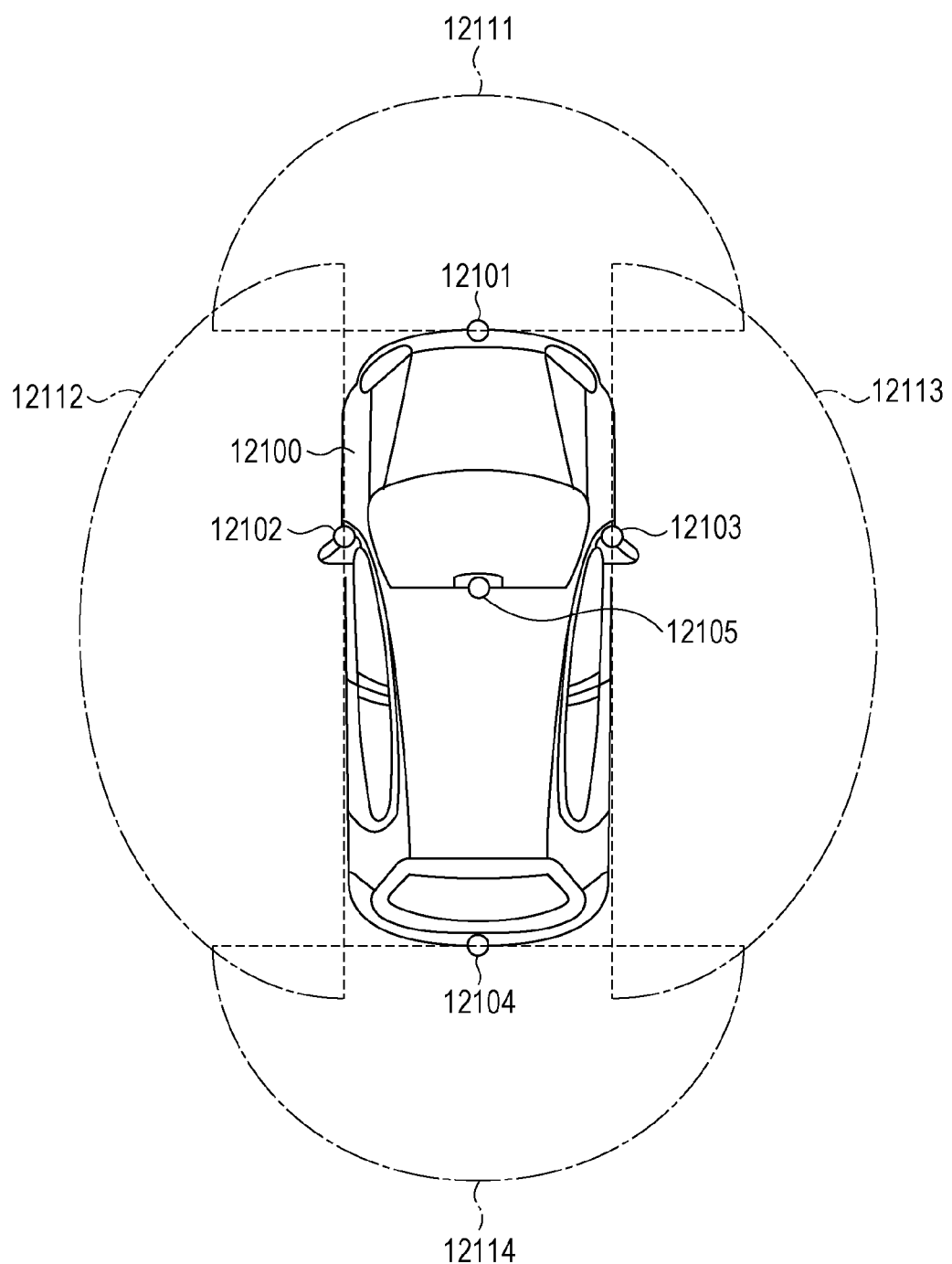
FIG. 26 is an explanatory diagram illustrating exemplary positions for installing a vehicle exterior information detection unit and an imaging unit.

FIG. 26 is a diagram illustrating an exemplary installation position of the imaging unit 12031.

In FIG. 26, imaging units 12101, 12102, 12103, 12104, and 12105 are included as the imaging unit 12031.

For example, the imaging units 12101, 12102, 12103, 12104, and 12105 are provided at a position such as a front nose, a side mirror, a rear bumper, a back door, and the upper portion of a vehicle interior windshield of a vehicle 12100. The imaging unit 12101 provided on the front nose and the imaging unit 12105 provided on the upper portion of the vehicle interior windshield mainly obtain an image in front of the vehicle 12100. The imaging units 12102 and 12103 provided on the side mirrors mainly obtain an image of the lateral sides of the vehicle 12100. The imaging unit 12104 provided on the rear bumper or the back door mainly obtains an image behind the vehicle 12100. The imaging unit 12105 provided on the upper portion of the vehicle interior windshield is mainly used for detecting a leading vehicle, a pedestrian, an obstacle, a traffic signal, a traffic sign, a lane, and the like.

Note that exemplary imaging ranges of the imaging units 12101 to 12104 are illustrated in FIG. 26. An imaging range 12111 indicates an imaging range of the imaging unit 12101 provided on the front nose, imaging ranges 12112 and 12113 indicate imaging ranges of the imaging units 12102 and 12103 provided on the side mirrors, respectively, and an imaging range 12114 indicates an imaging range of the imaging unit 12104 provided on the rear bumper or the back door. For example, image data captured by the imaging units 12101 to 12104 are superimposed, whereby an overhead image of the vehicle 12100 viewed from above can be obtained.

At least one of the imaging units 12101 to 12104 may have a function of obtaining distance information. For example, at least one of the imaging units 12101 to 12104 may be a stereo camera including a plurality of imaging elements, or may be an imaging element having pixels for detecting a phase difference.

For example, the microcomputer 12051 calculates, on the basis of the distance information obtained from the imaging units 12101 to 12104, a distance to each three-dimensional object within the imaging ranges 12111 to 12114 and a temporal change of the distance (relative speed with respect to the vehicle 12100), whereby particularly a three-dimensional object traveling at a predetermined speed (e.g., 0 km/h or more) in substantially the same direction as the vehicle 12100, which is the closest three-dimensional object on the traveling path of the vehicle 12100, can be extracted as a leading vehicle. Moreover, the microcomputer 12051 is capable of performing automatic brake control (including following travel stop control), automatic acceleration control (including following travel start control), and the like by setting the distance between vehicles to be secured in advance before a leading vehicle. In this manner, the cooperative control aiming at the autonomous driving for autonomously travelling without being dependent on the operation of the driver and the like can be performed.

For example, the microcomputer 12051 may extract, on the basis of the distance information obtained from the imaging units 12101 to 12104, three-dimensional object data related to a three-dimensional object after dividing it into a motorcycle, an ordinary car, a large vehicle, a pedestrian, and other three-dimensional objects such as a utility pole, which may be used for automatic avoidance of obstacles. For example, the microcomputer 12051 distinguishes obstacles around the vehicle 12100 as an obstacle that can be visually recognized by the driver of the vehicle 12100 and an obstacle less likely to be visually recognized. Then, the microcomputer 12051 determines a collision risk indicating a degree of risk of collision with each obstacle, and in a case where the collision risk is equal to or higher than a set value and there is a possibility of collision, a warning is output to the driver via the audio speaker 12061 or the display 12062, or forced deceleration or avoidance steering is performed via the drive system control unit 12010, whereby driving support for avoiding collision can be performed.

At least one of the imaging units 12101 to 12104 may be an infrared camera for detecting infrared rays. For example, the microcomputer 12051 can recognize a pedestrian by determining whether or not the pedestrian exists in the image captured by the imaging units 12101 to 12104. Such recognition of the pedestrian is performed through, for example, a procedure of extracting characteristic points in the image captured by the imaging units 12101 to 12104 as infrared cameras, and a procedure of performing pattern matching processing on a series of characteristic points indicating the outline of the object to determine whether or not it is a pedestrian. When the microcomputer 12051 determines that a pedestrian exists in the image captured by the imaging units 12101 to 12104 and recognizes the pedestrian, the audio image output unit 12052 controls the display 12062 in such a manner that a square outline for emphasizing the recognized pedestrian is displayed in a superimposed manner. Furthermore, the audio image output unit 12052 may control the display 12062 in such a manner that an icon or the like indicating the pedestrian is displayed at a desired position.

An exemplary vehicle control system to which the technology according the present disclosure may be applied has been described above. The technology according to the present disclosure may be applied to the imaging unit 12031 in the configuration described above. Specifically, the imaging device 100 in FIG. 1 may be applied to the imaging unit 12031. With the technology according to the present disclosure applied to the imaging unit 12031, pixels are miniaturized and a more easily viewable captured image can be obtained, whereby it becomes possible to alleviate fatigue of a driver.

Note that the embodiments described above are examples for embodying the present technology, and the matters in the embodiments and the matters used to specify the invention in the claims have a correspondence relationship. Similarly, the matters used to specify the invention in the claims and the matters in the embodiments of the present technology with names same as those have a correspondence relationship. However, the present technology is not limited to the embodiments, and may be embodied by the embodiments being subject to various modifications without departing from the gist thereof.

Note that the effects described herein are merely examples and not limited, and additional effects may be included.

Note that the present technology may also employ the following configurations.

(1) A solid-state imaging element including:
a plurality of detection pixels each of which generates a voltage signal corresponding to a logarithmic value of a photocurrent; and
a detection circuit that detects whether or not a change amount of the voltage signal of a detection pixel indicated by an input selection signal among the plurality of detection pixels exceeds a predetermined threshold value.

(2) The solid-state imaging element according to (1) described above, in which
the detection circuit includes:
a selection unit that selects any of the voltage signal of each of the plurality of detection pixels;
a differentiator that obtains and outputs a change amount of the selected voltage signal; and
a comparison unit that compares the output change amount with the threshold value.

(3) The solid-state imaging element according to (2) described above, in which
the differentiator retains the selected change amount and outputs the selected change amount to the comparison unit.

(4) The solid-state imaging element according to (2) described above, in which
the differentiator retains the change amount of each of the plurality of detection pixels, and outputs the change amount corresponding to the selected detection pixel to the comparison unit.

(5) The solid-state imaging element according to any one of (1) to (4) described above, in which
each of the plurality of detection pixels includes:

a logarithmic response unit that generates the voltage signal; and
a differentiator that obtains a change amount of the generated voltage signal and outputs the change amount to the detection circuit.
(6) The solid-state imaging element according to (5) described above, in which the detection circuit includes a comparison unit that selects any of the change amount of each of the plurality of detection pixels and compares the selected change amount with the threshold value.
(7) The solid-state imaging element according to (5) described above, in which
the detection circuit includes:
a selection unit that selects any of the change amount of each of the plurality of detection pixels; and
a comparison unit that compares the selected change amount with the threshold value.
(8) The solid-state imaging element according to (7) described above, in which
the threshold value includes an upper limit threshold value and a lower limit threshold value that are different from each other, and
the detection circuit includes:
an upper-limit-side comparator that compares the upper limit threshold value with the change amount; and
a lower-limit-side comparator that compares the lower limit threshold value with the change amount.
(9) The solid-state imaging element according to (7) described above, in which
the threshold value includes an upper limit threshold value and a lower limit threshold value that are different from each other, and
the detection circuit includes:
a selection switch that selects either the upper limit threshold value or the lower limit threshold value; and
a comparator that compares the selected threshold value with the change amount.
(10) The solid-state imaging element according to any one of (1) to (9) described above, further including: a plurality of gradation pixels each of which generates a pixel signal corresponding to an exposure amount.
(11) The solid-state imaging element according to (1) described above, in which
the threshold value includes an upper limit threshold value and a lower limit threshold value that are different from each other, and
the detection circuit includes:
an upper-limit-side selector that selects the change amount of one of two detection pixels;
a lower-limit-side selector that selects the change amount of the other of the two detection pixels;
an upper-limit-side comparator that compares the one selected change amount with the upper limit threshold value; and
a lower-limit-side comparator that compares the other selected change amount with the upper limit threshold value.
(12) The solid-state imaging element according to (1) described above, in which
the detection circuit includes:
a plurality of comparators that compares the change amount of the detection pixels different from each other with a threshold value;
a selection unit that selects a comparison result of any of the comparators; and
a buffer that outputs the selected comparison result.
(13) The solid-state imaging element according to any one of (1) to (11) described above, in which
a part of the plurality of detection pixels and the detection circuit is disposed on a predetermined light receiving chip, and
the rest of the plurality of detection pixels and the detection circuit is disposed on a predetermined detection chip.
(14) An imaging device including:
a plurality of detection pixels each of which generates a voltage signal corresponding to a logarithmic value of a photocurrent;
a detection circuit that detects whether or not a change amount of the voltage signal of a detection pixel indicated by an input selection signal among the plurality of detection pixels exceeds a predetermined threshold value; and
a signal processing unit that processes a detection signal indicating a detection result of the detection circuit.
(15) A method for controlling a solid-state imaging element, the method including:
a voltage signal generation procedure in which each of a plurality of detection pixels generates a voltage signal corresponding to a logarithmic value of a photocurrent; and
a detection procedure in which a detection circuit detects whether or not a change amount of the voltage signal of a detection pixel indicated by an input selection signal among the plurality of detection pixels exceeds a predetermined threshold value.

REFERENCE SIGNS LIST

100 Imaging device
110 Optical unit
120 Recording unit
130 Control unit
200 Solid-state imaging element
201 Light receiving chip
202 Detection chip
211 to 213, 231 to 233 Via arrangement portion
220 Light receiving unit
221 Shared block
240 Signal processing circuit
251 Row driving circuit
252 Column driving circuit
260 Address event detection unit
270 Column ADC
300 Detection pixel
305 Detection circuit
310 Logarithmic response unit
311, 371 Photoelectric conversion element
312, 313, 347, 512 nMOS transistor
314, 345, 346, 411, 511, 513 pMOS transistor
320 Detection block
330, 544 Buffer
340 Differentiator
341, 343, 351, 352, 355, 356 Capacitor
342 Inverter
344, 353, 354, 431, 530, 543, 544, 551 to 553 Switch
360 Transfer circuit
370 Gradation pixel
372 Transfer transistor
373 Reset transistor
374 Floating diffusion layer
375 Amplification transistor
376 Selection transistor 400 Selection unit
410, 420 Selector
500 Comparison unit
510, 520, 542 Comparator
541, 542 Capacitance
12031 Imaging unit

The invention claimed is:

1. A solid-state imaging element comprising:
a plurality of detection pixels each of which generates a voltage signal corresponding to a logarithmic value of a photocurrent; and
a detection circuit that detects whether or not a change amount of the voltage signal of a detection pixel indicated by an input selection signal among the plurality of detection pixels exceeds a predetermined threshold value,
the detection circuit including a selection circuit, a differentiator and a comparison circuit, wherein
the selection circuit selects any of the voltage signal of each of the plurality of detection pixels,
the differentiator obtains and outputs the change amount of the selected voltage signal,
the comparison circuit compares the output change amount with the threshold value, and
the differentiator retains the selected change amount and outputs the selected change amount to the comparison circuit.

2. The solid-state imaging element according to claim 1, wherein each of the plurality of detection pixels includes:
a logarithmic response circuit that generates the voltage signal.

3. The solid-state imaging element according to claim 2, wherein the comparison circuit selects any of the change amount of each of the plurality of detection pixels and compares the selected change amount with the threshold value.

4. The solid-state imaging element according to claim 1, wherein
the threshold value includes an upper limit threshold value and a lower limit threshold value that are different from each other, and
the detection circuit includes:
an upper-limit-side selector that selects the change amount of one of two detection pixels;
a lower-limit-side selector that selects the change amount of the other of the two detection pixels;
an upper-limit-side comparator that compares the one selected change amount with the upper limit threshold value; and
a lower-limit-side comparator that compares the other selected change amount with the upper limit threshold value.

5. The solid-state imaging element according to claim 1, wherein
the comparison circuit includes a plurality of comparators that compares the change amount of the detection pixels different from each other with a threshold value,
the selection circuit selects a comparison result of any of the comparators, and
the detection circuit includes a buffer that outputs the selected comparison result.

6. The solid-state imaging element according to claim 1, wherein
a part of the plurality of detection pixels and the detection circuit is disposed on a predetermined light receiving chip, and the rest of the plurality of detection pixels and the detection circuit is disposed on a predetermined detection chip.

7. A solid-state imaging element comprising:
a plurality of detection pixels each of which generates a voltage signal corresponding to a logarithmic value of a photocurrent, and
a detection circuit that detects whether or not a change amount of the voltage signal of a detection pixel indicated by an input selection signal among the plurality of detection pixels exceeds a predetermined threshold value,
the detection circuit including a selection circuit, a differentiator and a comparison circuit, wherein
the selection circuit selects any of the voltage signal of each of the plurality of detection pixels,
the differentiator obtains and outputs the change amount of the selected voltage signal, the comparison circuit compares the output change amount with the threshold value, and
the differentiator retains the change amount of each of the plurality of detection pixels, and outputs the change amount corresponding to the selected detection pixel to the comparison circuit.

8. A solid-state imaging element comprising:
a plurality of detection pixels each of which generates a voltage signal corresponding to a logarithmic value of a photocurrent, and
a detection circuit that detects whether or not a change amount of the voltage signal of a detection pixel indicated by an input selection signal among the plurality of detection pixels exceeds a predetermined threshold value, wherein
each of the plurality of detection pixels includes:
a logarithmic response circuit that generates the voltage signal; and
a differentiator that obtains a change amount of the generated voltage signal and outputs the change amount to the detection circuit,
the detection circuit includes:
a selection circuit that selects any of the change amount of each of the plurality of detection pixels; and
a comparison circuit that compares the selected change amount with the threshold value,
the threshold value includes an upper limit threshold value and a lower limit threshold value that are different from each other,
the detection circuit includes a selection switch that selects either the upper limit threshold value or the lower limit threshold value, and
the comparison circuit compares the selected threshold value with the change amount.

9. A solid-state imaging element comprising:
a plurality of detection pixels each of which generates a voltage signal corresponding to a logarithmic value of a photocurrent;
a detection circuit that detects whether or not a change amount of the voltage signal of a detection pixel indicated by an input selection signal among the plurality of detection pixels exceeds a predetermined threshold value; and
a plurality of gradation pixels each of which generates a pixel signal corresponding to an exposure amount.

10. An imaging device comprising:
a plurality of detection pixels each of which generates a voltage signal corresponding to a logarithmic value of a photocurrent;

a detection circuit that detects whether or not a change amount of the voltage signal of a detection pixel indicated by an input selection signal among the plurality of detection pixels exceeds a predetermined threshold value; and a signal processor that processes a detection signal indicating a detection result of the detection circuit, wherein the detection circuit includes:

a selection circuit that selects any of the voltage signal of each of the plurality of detection pixels;

a differentiator that obtains and outputs a change amount of the selected voltage signal; and a comparison circuit that compares the output change amount with the threshold value, and the differentiator retains the selected change amount and outputs the selected change amount to the comparison circuit.

11. An imaging device comprising:

a plurality of detection pixels each of which generates a voltage signal corresponding to a logarithmic value of a photocurrent;

a detection circuit that detects whether or not a change amount of the voltage signal of a detection pixel indicated by an input selection signal among the plurality of detection pixels exceeds a predetermined threshold value; and a signal processor that processes a detection signal indicating a detection result of the detection circuit, wherein the detection circuit includes:

a selection circuit that selects any of the voltage signal of each of the plurality of detection pixels;

a differentiator that obtains and outputs a change amount of the selected voltage signal; and a comparison circuit that compares the output change amount with the threshold value, and the differentiator retains the change amount of each of the plurality of detection pixels, and outputs the change amount corresponding to the selected detection pixel to the comparison circuit.

* * * * *